US006824466B1

(12) United States Patent
Hirota

(10) Patent No.: US 6,824,466 B1
(45) Date of Patent: Nov. 30, 2004

(54) GAME MACHINE

(75) Inventor: Michinori Hirota, Tokyo (JP)

(73) Assignee: Aruze Corporation, Tokyo (JP)

(*) Notice: Subject to any disclaimer, the term of this patent is extended or adjusted under 35 U.S.C. 154(b) by 0 days.

(21) Appl. No.: 09/643,685

(22) Filed: Aug. 24, 2000

(30) Foreign Application Priority Data

Aug. 25, 1999 (JP) ........................................... 11-238349

(51) Int. Cl.[7] ................................................ A63F 13/08

(52) U.S. Cl. ............................ 463/20; 463/16; 463/21; 463/22; 273/143 R; 273/148 R; 273/148 B

(58) Field of Search .............................. 463/16, 20, 21, 463/22; 273/143 R, 148 R, 148 B

(56) References Cited

U.S. PATENT DOCUMENTS 4,573,681 A * 3/1986 Okada .................... 273/143 R
4,715,604 A * 12/1987 Okada .................... 273/143 R
4,721,307 A * 1/1988 Okada .................... 273/143 R
4,889,339 A * 12/1989 Okada .................... 273/143 R
5,074,559 A * 12/1991 Okada .................... 273/143 R
5,083,785 A * 1/1992 Okada .................... 273/143 R
5,393,061 A * 2/1995 Manship et al. .............. 463/20
5,704,835 A * 1/1998 Dietz, II ...................... 463/20

FOREIGN PATENT DOCUMENTS

| | | |
|---|---|---|
| CH | 561 074 | 4/1975 |
| EP | 0 923 058 | 6/1999 |
| GB | 2 248 712 | 4/1992 |

* cited by examiner

*Primary Examiner*—Jessica Harrison
*Assistant Examiner*—Yveste G. Cherubin
(74) *Attorney, Agent, or Firm*—Venable LLP; Andrew C. Aitken

(57) ABSTRACT

A game machine comprises shift and display section for shifting and displaying various kinds of symbol marks, the shift and display section having prize winning lines formed thereon, in which a predetermined set of symbol marks stopped and displayed on one of the prize winning lines cause a wining prize to be awarded to a game player, the predetermined set of symbol marks including a plurality of symbol marks neighboring to each other to form a specified symbol mark.

4 Claims, 21 Drawing Sheets

(a)

(b)

| PRIZE WINNING STATE | WINNING COMBINATION | | | DIVIDEND RATE IN THE REGULAR GAME | DIVIDEND RATE IN THE BB GAME |
|---|---|---|---|---|---|
| | FIRST ROTATION REEL | SECOND ROTATION REEL | THIRD ROTATION REEL | | |
| BB |  |  |  | 15 | — |
| RB |  |  |  | 15 | — |
| HAT |  |  |  | 7 | 9 |
| CACTUS |  |  |  | 3 | 3 |
| UPPER SUN HALF |  | — | — | 1 | 1 |
| LOWER SUN HALF |  | — | — | 7 | 7 |
| RP |  |  |  | — | 9 |

FIG.8

| PRIZE WINNING STATE / NUMBER OF THE INSERTED GAME MEDALS | SMALL | | | | | MEDIUM | BIG |
|---|---|---|---|---|---|---|---|
| | LOWER SUN HALF | UPPER SUN HALF | CACTUS | HAT | REPLAY | RB | BB |
| 1 | a1 | b1 | c1 | d1 | e1 | f1 | g1 |
| 2 | a2 | b2 | c2 | d2 | e2 | f2 | g2 |
| 3 | a3 | b3 | c3 | d3 | e3 | f3 | g3 |

FIG.10

| CODE No. | ROTATION REEL 1 | ROTATION REEL 2 | ROTATION REEL 3 |
|---|---|---|---|
| 0 | A | A | A |
| 1 | A | G | C |
| 2 | C | C | G |
| 3 | G | E | D |
| 4 | D | B | E |
| 5 | G | G | C |
| 6 | D | C | G |
| 7 | C | D | E |
| 8 | E | A | F |
| 9 | F | G | C |
| 10 | B | E | G |
| 11 | C | C | D |
| 12 | G | E | E |
| 13 | D | G | B |
| 14 | C | C | C |
| 15 | D | D | G |
| 16 | G | E | D |
| 17 | C | G | B |
| 18 | G | C | C |
| 19 | D | B | G |
| 20 | D | E | E |

FIG.15

| GAME CONDITION | NUMBER OF LOTTERY ACTION | WINNING PRIZES AND ORDER NUMBERS | |
|---|---|---|---|
| REGULAR GAME | 7 | 1 | LOWER SUN HALF |
| | | 2 | UPPER SUN HALF |
| | | 3 | CACTUS |
| | | 4 | HAT |
| | | 5 | REPLAY |
| | | 6 | RB |
| | | 7 | BB WITHOUT CT |
| | | 8 | BB WITH CT |
| BB/RB INNER WINNING | 5 | 1 | LOWER SUN HALF |
| | | 2 | UPPER SUN HALF |
| | | 3 | CACTUS |
| | | 4 | HAT |
| | | 5 | REPLAY |
| BB REGULAR GAME | 5 | 1 | LOWER SUN HALF |
| | | 2 | UPPER SUN HALF |
| | | 3 | CACTUS |
| | | 4 | HAT |
| | | 5 | RB IN BB |
| CT PERIOD | 7 | 1 | — |
| | | 2 | — |
| | | 3 | — |
| | | 4 | — |
| | | 5 | REPLAY |
| | | 6 | RB |
| | | 7 | BB WITHOUT CT |
| | | 8 | BB WITH CT |

FIG.16

| WINNING PRIZE | LOWER SUN HALF | UPPER SUN HALF | CACTUS | HAT | REPLAY | RB | BB WITHOUT CT | NO PRIZE |
|---|---|---|---|---|---|---|---|---|
| HIT SEGMENT DATA | a3=1200<br>0~1199<br>(SIZE1200) | b3=2300<br>1200~2299<br>(SIZE1100) | c3=4100<br>2300~4099<br>(SIZE1800) | d3=4350<br>4100~4349<br>(SIZE250) | e3=6600<br>4350~6599<br>(SIZE2250) | f3=6645<br>6600~6644<br>(SIZE45) | g3=6700<br>6645~6699<br>(SIZE55) | 6700<br>~16384 |
| PRIZE WINNING NUMBER | 1 | 2 | 3 | 4 | 5 | 6 | 7 | |

FIG. 17

(a)

| GAME CONDITION STATE | |
|---|---|
| CONTENTS | DATA |
| RB GAME | 01H |
| BB GAME | 02H |
| REGULAR GAME | 03H |
| BB INNER WINNING | 04H |
| RB INNER WINNING | 05H |
| CT PERIOD | 06H |

(b)

| PRIZE WINNING REQUEST FLAG | | | |
|---|---|---|---|
| BIT 7 | BB WITHOUT CT | 0:LOSE | 1:WIN |
| 6 | RB | 0:LOSE | 1:WIN |
| 5 | REPLAY,RB IN BB, OR OTHERS | 0:LOSE | 1:WIN |
| 4 | HAT | 0:LOSE | 1:WIN |
| 3 | CACTUS | 0:LOSE | 1:WIN |
| 2 | UPPER SUN HALF | 0:LOSE | 1:WIN |
| 1 | LOWER SUN HALF | 0:LOSE | 1:WIN |
| 0 | BB WITH CT | 0:LOSE | 1:WIN |

FIG.18

(a)

| PRIORITY ORDER | WINNING PRIZE | NUMBER OF SYMBOL MARKS TO BE SHIFTED |
|---|---|---|
| 1 | REPLAY | 4 |
| 2 | SMALL PRIZE | 4 |
| 3 | BB,RB | 4 |

(b)

| PRIORITY ORDER | WINNING PRIZE | NUMBER OF SYMBOL MARKS TO BE SHIFTED |
|---|---|---|
| 1 | HAT | 1 |
| 2 | CACTUS | 1 |
| 3 | UPPER SUN HALF | 0 |
| 4 | LOWER SUN HALF | 0 |

FIG.20

| CODE No. | PRIZE WINNING EXPECTATION FLAG | | | |
|---|---|---|---|---|
| | BIG PRIZE | MEDIUM PRIZE | SMALL PRIZE | NO PRIZE |
| 0 | 0 | 0 | 0 | 1 |
| 1 | 0 | 1 | 0 | 0 |
| 2 | 0 | 1 | 0 | 0 |
| 3 | 0 | 0 | 0 | 1 |
| 4 | 0 | 0 | 0 | 1 |
| 5 | 1 | 0 | 1 | 0 |
| : | : | : | : | : |
| 20 | 0 | 0 | 0 | 1 |

FIG.21

| GAME CONDITION | REGULAR GAME | | BB/RB INNER WINNING | | BB REGULAR GAME | | CT PERIOD | |
|---|---|---|---|---|---|---|---|---|
| NUMBER OF LOTTERY ACTIONS | 7 | | 5 | | 3 | | 4 | |
| WINNING PRIZES AND ORDER NUMBERS | 1 | "SUN" GROUP | 1 | LOWER SUN HALF | 1 | "SMALL PRIZE" GROUP | 1 | REPLAY |
| | 2 | CACTUS | 2 | UPPER SUN HALF | 2 | REPLAY | 2 | RB |
| | 3 | HAT | 3 | CACTUS | 3 | RB IN BB | 3 | BB WITHOUT CT |
| | 4 | REPLAY | 4 | HAT | | | 4 | BB WITH CT |
| | 5 | RB | 5 | REPLAY | | | | |
| | 6 | BB WITHOUT CT | | | | | | |
| | 7 | BB WITH CT | | | | | | |

GAME MACHINE

BACKGROUND OF INVENTION

1. Field of the Invention

The present invention relates to a game machine which can provide a game player with a thrilling and exciting fun in a game, and in particular to a game machine which comprises shift and display means for shifting and displaying various kinds of symbol marks and awarding means for awarding a winning prize to a game player when a predetermined set of symbol marks are stopped and displayed on a prize winning line.

2. Description of the Related Art

There has so far been proposed a game machine such as a slot machine which generally comprises a start lever to be operated by a game player, a plurality of rotation reels forming part of the shift and display means, and a plurality of stop buttons for selectively stopping the respective rotation reels after all the rotation reels are driven to rotate simultaneously with the operation of the start lever by a game player. The stopping of each of the rotation reels will result in awarding a winning prize to the game player when a predetermined set of symbol marks are stopped and displayed on an effective prize winning line of the observation window. At this time, a predetermined number of game medals are paid out to the game player in proportion to a winning state resulted from a lottery action run in the slot machine. The winning state is determined in accordance with the segment of a prize probability table to which a random number sampled by the lottery action belongs. More specifically, the segment having the random number generated as a result of the lottery action belong defines a winning state, which in turn defines a kind of the prize winning request flag.

The stop positions of the rotating rotation reels are controlled to have the set of symbol marks representative of the type of the prize winning request flag stopped and displayed in the observation window. For instance, if the set of symbol marks representative of the winning state are currently not displayed in the observation window, however, located within four symbol marks to be displayed subsequently, the concerned rotation reels, outside of which the target symbol marks are drawn, are controlled to rotate with the result that the target set of symbol marks are stopped and displayed (the control operation is hereinafter referred to as "stop and display control operation").

There is provided a slot machine called "CT (Challenge Time) machine" which is designed to interrupt the stop and display control operation for one or more specific rotation reels (hereinafter referred to as "specific rotation reels") with the certain winning conditions completed for a certain period. The period is hereinafter referred to as "CT period". For instance, the condition for the small winning prize satisfied causes the CT machine to interrupt the stop and display control operation for the specific rotation reels. This results in the fact that the stop positions of the specific rotation reels are determined merely by the operation timing of a game player. During a CT period in which the stop and display control operation is interrupted, the stop and display control operation is still active for some rotation reels (hereinafter referred to as "remaining rotation reels") other than the specific rotation reels. The remaining rotation reels are controlled to have the target set of symbol marks stopped and displayed as long as they are located within four symbol marks to be displayed subsequently at the time when the game player operates the stop button.

The CT machine of this type is disclosed by the Japanese Patent Publication No. 1-238888 which is laid open in 1989.

For the aforesaid CT machine, the stop position of the specific rotation reel determined during the CT period totally depends upon the operational skill of the stop button by a game player. It is generally difficult for unskilled game players to operate the stop button at a right timing with a visual observation of the symbol marks appeared on the observation window so as to stop and display the desired set of the symbol marks on any of the effective prize winning lines of the observation window. This operation of the stop button by the game player with the careful observation of the symbol marks is hereinafter simply referred to as "observation push" for brevity. As a consequence, experienced game players like and enthusiastically play the CT machine while the inexperienced game players tend to refrain from playing it.

The conventional slot machine other than the CT machine can be operated to perform the stop and display control operation. However, the stop and display control operation merely serves as one help means for the game players to perform the aforesaid observation push. The stop and display control operation allows operation error only up to four symbol marks to be adjusted. Accordingly, it is still difficult for the inexperienced game player to perform the observation push to stop and display the desired set of symbol marks on any of the effective prize winning lines of the observation window even with the conventional slot machine provided with the stop and display control function.

In order to make it possible for the inexperienced game players to facilitate the operation of the foregoing observation push, there may be considered another improvement having a specified symbol mark relatively large in compassion with the other symbol marks. Among other thing, the specified symbol mark has a lateral width laterally extending enough to the lateral width of the rotation reels forming part of the shift and display means to ensure that the observation plush can easily be performed, thereby enabling the lateral edges of the specified symbol mark to readily be watched by the game payer. The specified symbol mark targeted by the game player is frequently apt to be changed in response to the game conditions of the game machine. For example, the game machine is operated under the bonus inner winning game condition, it is necessary to stop and display the set of symbol marks representative of the bonus prize winning state (e.g., seven) on the prize winning line by the observation push. Or otherwise, the current game condition of the game machine is the CT period, the game player should stop and display the set of symbol marks representative of the small prize winning state on the prize winning line by the observation push.

This leads to the fact that the aforementioned game machine is required to be provided with a plurality of specified symbol marks each having a relatively large lateral width in the lateral direction, i.e., horizontal direction of the rotation reels. If the number of such specified symbol marks is increased, the specified symbol marks tends to be watched and recognized by the game player as being interfered with one another, thereby resulting in loss of the effect stemming from the large sizes of the specified symbol marks.

The symbol mark themselves are formed to have a lateral width as large as the lateral edges of the rotation reels. It is therefore impossible for the symbol marks to be designed to have a length in the rotation direction, i.e., vertical direction of the rotation reels. This means that the symbol marks each having a human body horizontally extending on a bed can be drawn while the symbol marks each having a human body vertically erected is difficult to be drawn.

On the other hand, the specified symbol marks may be considered to be relatively large in the vertical direction of the rotation reels as compared with the other symbol marks for the inexperienced game player to be able to complete the observation push. The specified symbol marks are each exemplified by a specified symbol mark having a size two times as large as those of the other symbol marks in the vertical direction of the rotation reels. This large sized specified symbol mark causes such a problem that the large sized specified symbol mark extend across at least adjacent two winning lines of the observation window.

As an alternative way, there may be considered to make every symbol marks to be enlarged together with the rotation reels each having a large size corresponding to the size of the conventional symbol mark. The symbol marks thus enlarged trigger another problem that the enlarged symbol marks leads the game machine to have a big size in response to the sizes of the enlarged symbol marks, thereby making it impossible for the game machine to be accommodated in a pachinko parlor. This is because the game machine such as a slot machine used in the pachinko parlor has a nationwide decided size but cannot be made to have a size larger than the nationwide decided size by producing the rotation reels. It is therefore understood that the relative differentiation between the sizes of the specified symbol mark and the ordinary symbol mark makes it possible for the game player to be able to easily perform the observation push. Another idea is that the size of each symbol mark can be enlarged in proportion to the number of each symbol mark reduced. This idea also causes such a problem that the reduced number of the symbol marks on the rotation reels results in the kinds of winning chance being reduced, thereby causing the game itself to be tedious and boring.

The above mentioned game machine is designed in consideration of the game play in the "CT" period of the game machine but not produced by giving a consideration to the regular game period of the game machine which is extremely long as compared with the "CT" period of the game machine.

SUMMARY OF THE INVENTION

It is therefore an object of the present invention to provide a game machine which is designed in consideration not only of the game play in the "CT", period of the game machine but also of the regular game period of the game machine which is extremely long as compared with the "CT" period of the game machine.

It is another object of the present invention to provide a game machine which provides a game player with the improved fun by making the specified symbol mark in the form of an easy-viewable profile to the extent that the specified symbol marks can be easily identified from other symbol marks.

In accordance with the first aspect of the present invention, there is provided a game machine, comprising: shift and display means for shifting and displaying various kinds of symbol marks, the shift and display means having prize winning lines formed thereon, in which a predetermined set of symbol marks stopped and displayed on one of the prize winning lines cause a winning prize to be awarded to a game player, the predetermined set of symbol marks including a plurality of symbol marks neighboring to each other to form a specified symbol mark.

The specified symbol mark is preferably in the form of an easy-viewable profile which can be easily identified from other symbol marks.

The shift and display means is partly constituted by a plurality of observation windows. The specified symbol mark includes a first semi-circular symbol mark formed in the shape of an upper half of a circular configuration having a diameter approximately equal to the lateral width of the observation window of the shift and display means, and a second semi-circular symbol mark formed in the shape of a lower half of a circular configuration and neighboring to the first semi-circular symbol mark to complete a circle in cooperation with the first semi-circular symbol mark.

According to the second aspect of present invention, the game machine comprises: shift and display means for shifting and displaying various kinds of symbol marks; a random number generator for generating random numbers divided into a plurality of random number segments; a random number sampler for sampling a random number from the random numbers generated by the random number generator, storage means for storing table data having a plurality of predetermined reference values; winning state determining means for determining a winning state on the basis of the sampled random number using the reference values of the table data; stop control means for controlling the stop of the shift and display means to have a set of symbol marks stopped and displayed on the basis of the winning state determined by the winning state determining means. The winning states include small, medium and big prize winning states. The winning state determining means is operative to determine a plurality of small prize winning states associated with one of the random number segments of the random numbers in one game, thereby making it possible for the small prize winning states to be requested in one game unless the big prize winning state or the medium prize winning state is requested. The stop control means is operative to control the shift and display means to have the specified symbol mark stopped and displayed on one of the prize winning lines of the shift and display means when the plurality of small prize winning states are requested.

According to the second aspect of present invention, the game machine, the game machine, comprises: shift and display means for shifting and displaying various kinds of symbol marks; a random number generator for generating random numbers divided into a plurality of random number segments; a random number sampler for sampling a random number from the random numbers generated by the random number generator, storage means for storing table data having a plurality of predetermined reference values; winning state determining means for determining a winning state on the basis of the sampled random number using the reference values of the table data; stop control means for controlling the stop of the shift and display means to have a set of symbol marks stopped and displayed on the basis of the winning state determined by the winning state determining means. The winning states include small, medium and big prize winning states. The winning state determining means is operative to determine a plurality of small prize winning states associated with one of the random number segments of the random numbers in one game, thereby making it possible for the small prize winning states to be requested in one game. The plurality of the small prize winning states are changed in accordance with the game condition.

According to the present invention, two small prizes can be won in the regular game condition, thereby making it possible for a specified symbol mark constituted by a plurality of symbol marks neighboring to each other to be stopped and displayed by means of the shift and display means. This results in the fact that the fun of the game in the regular game condition is extensively stimulated. In addition, with the aid of such a symbol mark, which is larger in the size than the other symbol marks, the observation push by the game player is facilitated as described hereinbefore.

The present invention also provides a game machine comprising: storage means for storing table data having a plurality of predetermined reference values; shift and display means for shifting and displaying various kinds of symbol marks; a random number generator for generating random numbers; a random number sampler for sampling a random number from the random numbers generated by the random number generator; winning state determining means for determining the winning state on the basis of the sampled random number using the table data; stop control means for controlling the stop of the shift and display means to have a set of symbol marks stopped and displayed, in which the game machine is operative under a plurality of game conditions, the winning states include small prize winning states, the winning state determining means is operative to determine a plurality of small prize winning states for one or more predetermined combinations of the small prize winning states in one game, and the one or more predetermined combinations of the small prize winning states are changed in accordance with the game condition.

The shift and display means can include a plurality of rotation reels having various kinds of symbol marks drawn on the outer surface thereof. The game machine may include a slot machine. A prize winning group constituted by a plurality of small prize winning states each representative of the respective segment of the lottery data table used for the lottery action run in the game machine can be changed depending on the game condition. This leads to the fact that the fun of the game player is stimulated. In addition the game player can recognize the current game condition by observing the won small prizes, thereby making it possible for the interest of the game player to be multiplied.

BRIEF DESCRIPTION OF THE DRAWINGS

The objects, features and advantages of the present invention will become apparent as the description proceeds when taken in conjunction with the accompanying drawings, in which:

FIG. 8 is a winning probability table to be used for the process of the processing unit forming part of the slot machine according to the present invention, FIG. 10 is a symbol table to be used for the process of the processing unit forming part of the slot machine according to the present invention, FIG. 15 is a lottery data table to be used for particularly explaining a probability lottery in FIG. 11 performed in the process of the processing unit forming part of the slot machine according to the present invention, FIG. 16 is a winning probability table shown in FIG. 8 but having a particular data therein, FIGS. 17(*a*) and 17(*b*) are data tables memorized in the memory area of the RAM forming part of the slot machine according to the present invention, FIGS. 18(*a*) and 18(*b*) are shifting-priority data tables to be used for the process of the processing unit forming part of the slot machine according to the present invention, FIGS. 19(*a*) to 19(*c*) are tables showing the relationships between the rotation reels and the symbol cords assigned to the rotation reels and read respectively by the processing unit forming part of the slot machine according to the present invention, FIG. 20 is a table showing a hit-expectation flag which is available for the process of the processing unit forming part of the slot machine according to the present invention, and FIG. 21 is a lottery data table specific to the game condition available for the process of provability lottery in the modified example of the slot machine according to the present invention.

DESCRIPTION OF THE PREFERRED EMBODIMENTS

The detailed description of the preferred embodiment according to the present invention applied to a slot machine called "CT machine" will now be made hereinafter with reference to the drawings.

Figure 1:
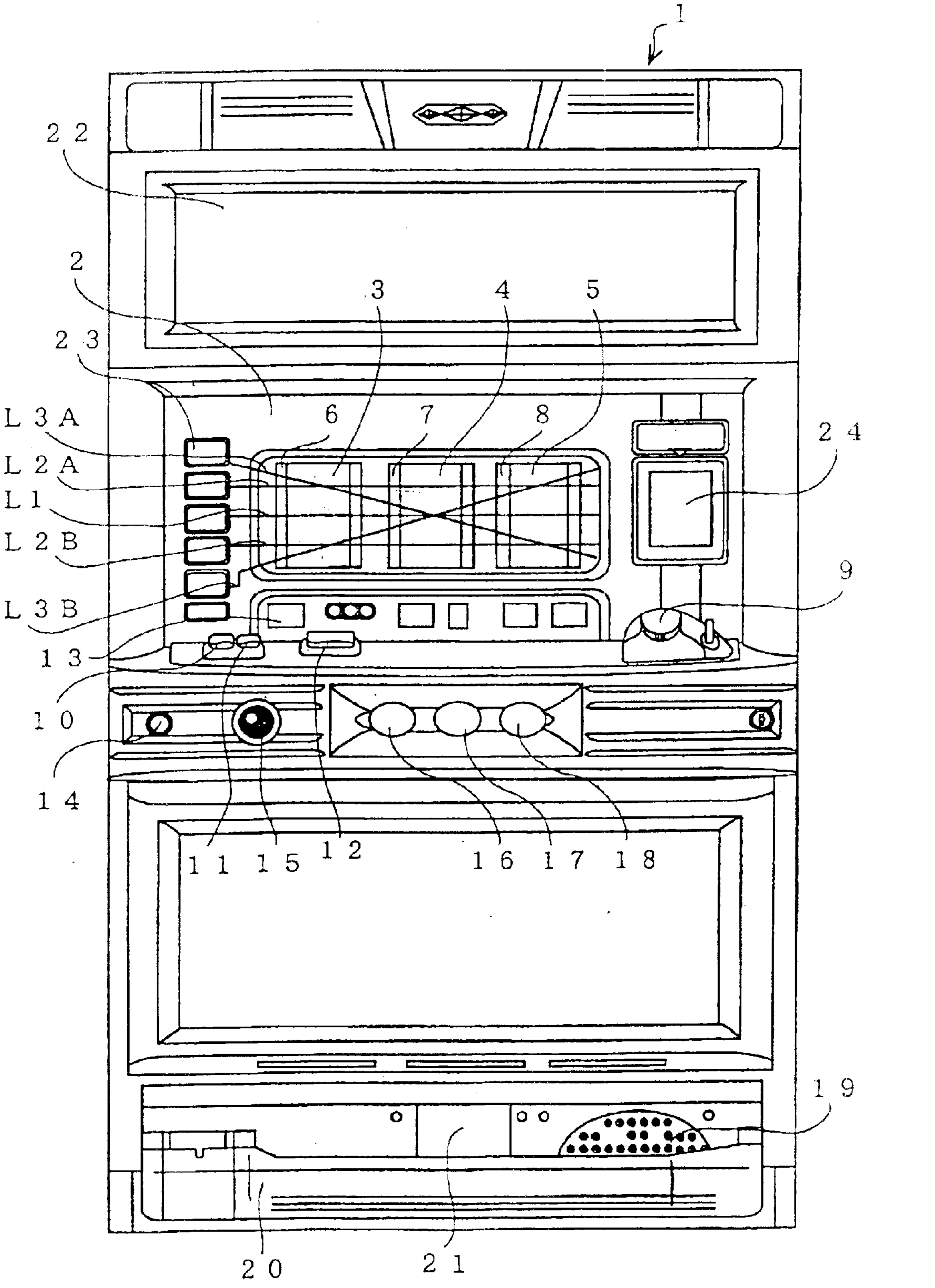
FIG. 1 is a front elevational view of one embodiment of the slot machine according to the present invention.

FIG. 1 is a front elevational view of the slot machine of the preferred embodiment.

Figure 2:
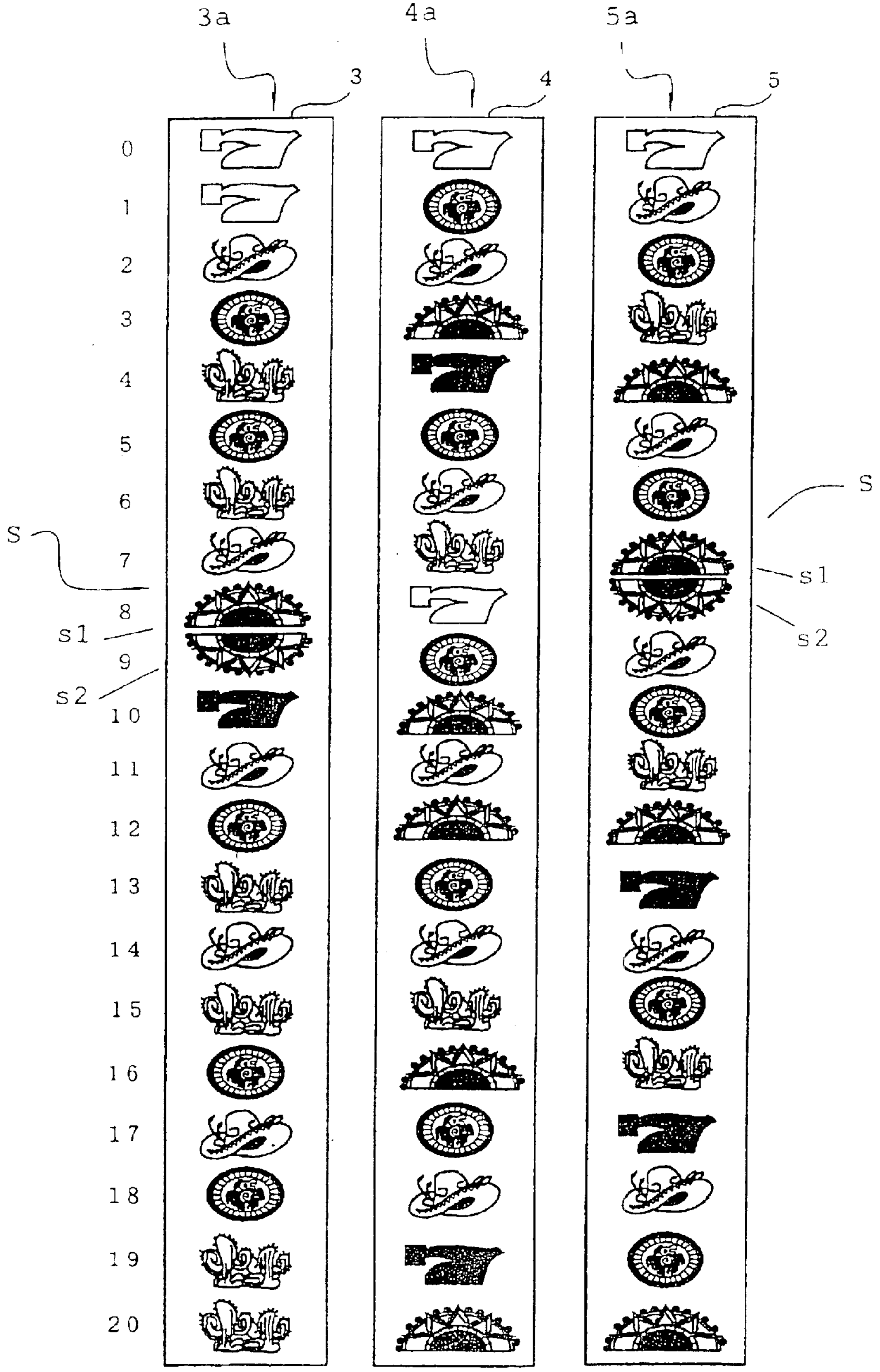
FIG. 2 is a pictorial view showing a plurality of combinations of symbol marks respectively depicted on the rotation reels forming part of the slot machine according to the present invention.
Figure 9:
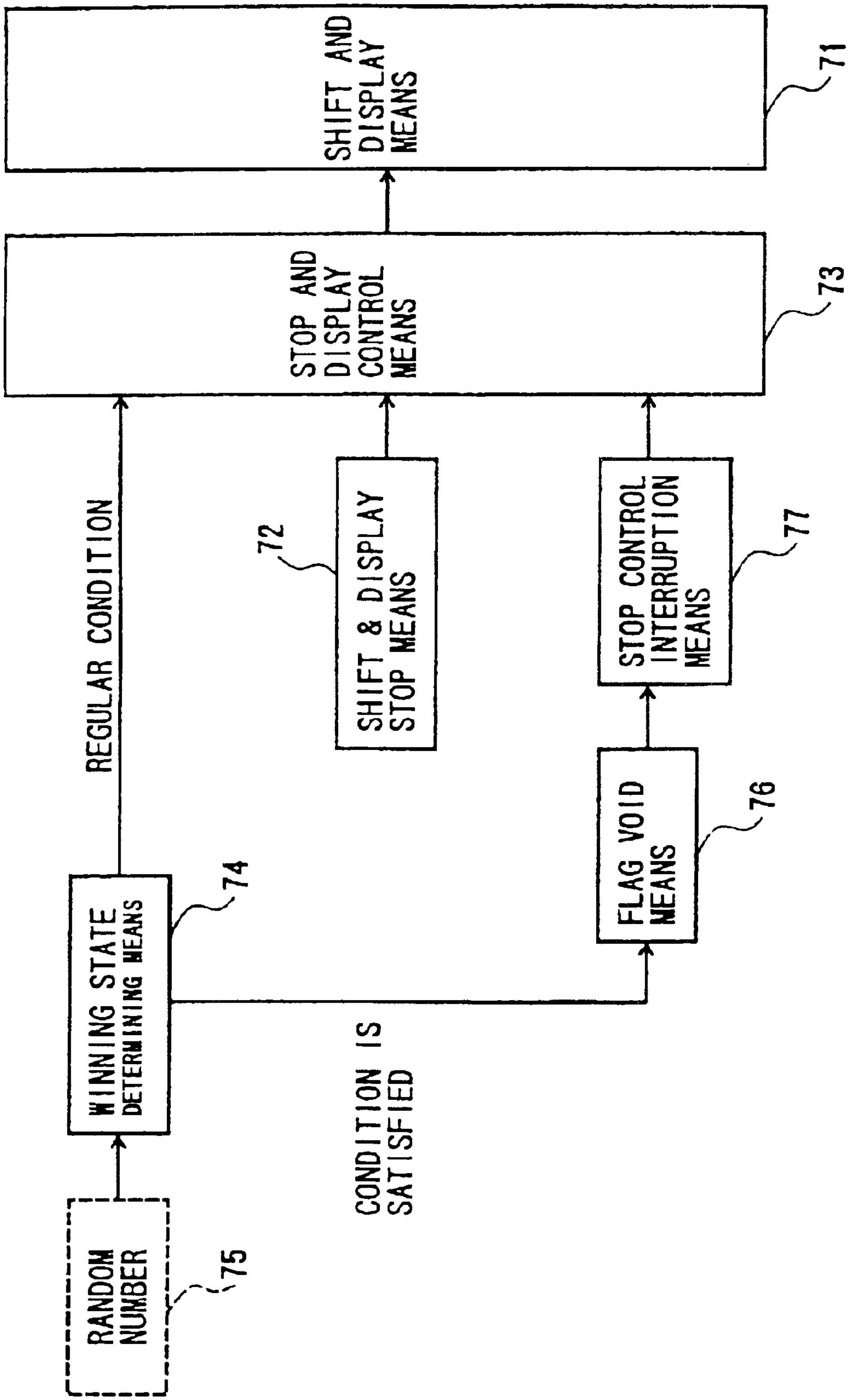
FIG. 9 is a block diagram showing a control circuit which enables the slot machine to be used as a CT slot machine according to the present invention.

The slot machine 1 is shown in FIG. 1 as comprising a front panel 2 having a rear portion which is adapted to rotatably support three rotation reels 3, 4 and 5 collectively constituting part of the shift and display means 71 (see FIG. 9) for shifting and displaying various kinds of symbol marks. FIG. 9 is a block diaphragm showing a constitution portion of the slot machine 1 of the embodiment according to the present invention acting as the CT machine. On the peripheral surface of each of the rotation reels 3, 4 and 5 is shown in FIG. 2 as being drawn a symbol row which is constituted by a plurality of symbol marks 3*a*, 4*a* and 5*a*. The kind of the symbol marks includes a total of seven different marks such as "white seven", "black seven", "hat", "bird", "cactus", "upper sun half" in the form of the upper half of the sun, and "lower sun half" in the form of the lower half of the sun.

The symbol marks "upper sun half" (s1) and "lower sun half" (s2) respectively constitute first and second semi-circular symbol marks which are respectively in the form of the upper and lower part of a circle having a diameter approximately the same as that of the rotation reel width of a rotation reel band 54 forming the peripheral surface of each of the rotation reels 3, 4 and 5. The first rotation reel 3 and the third rotation reel 5 each have upper and lower neighboring symbol marks which form as a whole a new symbol "the sun" (S).

Three symbol marks can be observed through the respective observation windows 6, 7 and 8 located on the front face of the slot machine 1. At the portion of the slot machine 1 on the lower and right side of the observation windows 6, 7 and 8 is provided a medal inserting slot 9 which serves to have the game player insert coin therein.

Figure 3:
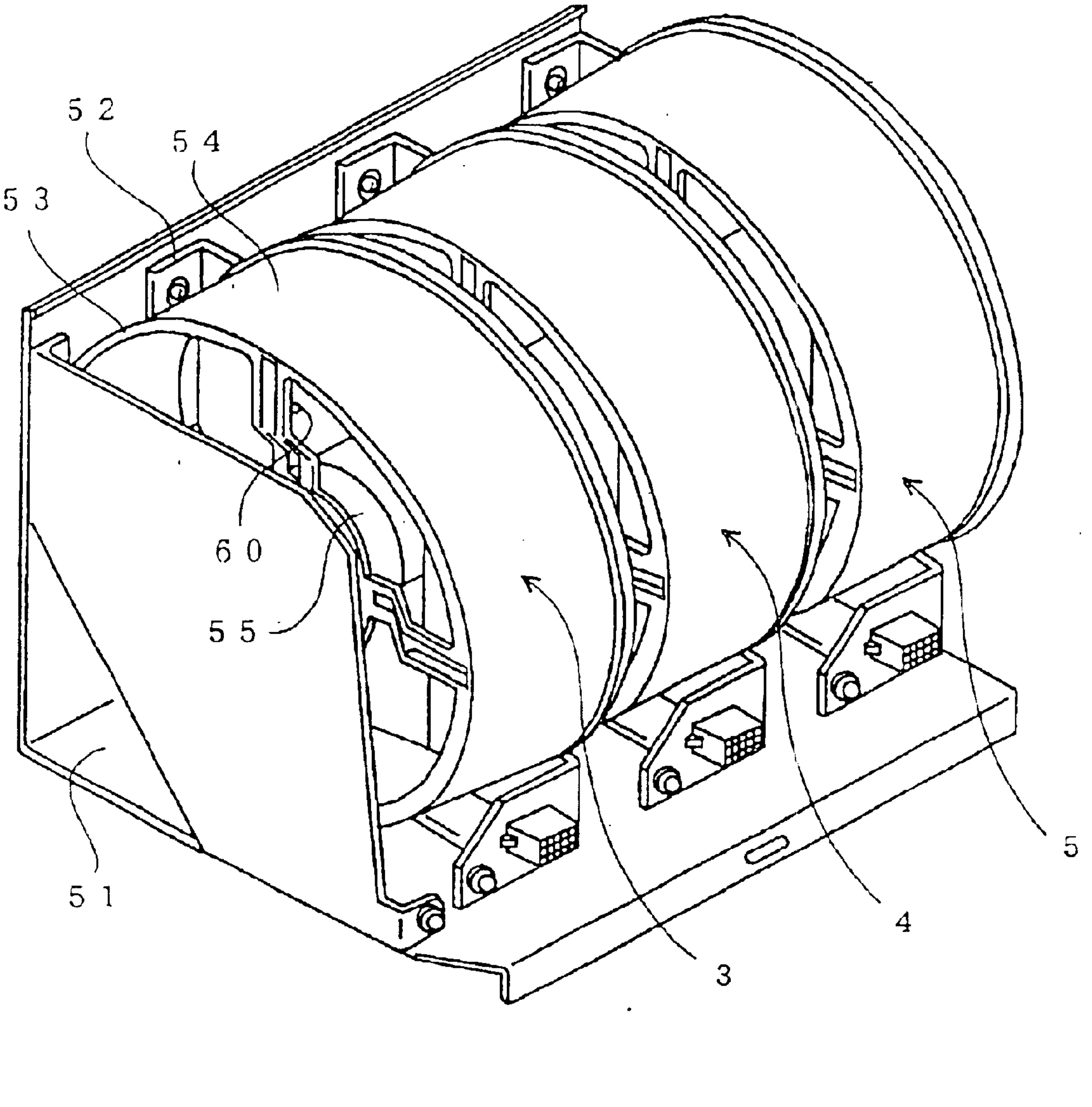
FIG. 3 is a perspective view of the rotation reel unit forming part of the slot machine according to the present invention, FIG. 4(*a*) is a perspective view of the rotation reel forming part of the rotation reel unit of the slot machine according to the present invention, FIG. 4(*b*) is a perspective view of back lumps and a base plate having thereon the back lumps supported, FIGS. 5(*a*) to 5(*c*) are diagrammatic views respectively showing winning lines in their effective state on the observation windows forming part of the rotation reel unit of the slot machine according to the present invention.

The rotation reels 3, 4 and 5 are best shown in FIG. 3 as collectively constituting a rotation reel unit and are independently rotatably mounted on a frame 51 by respective brackets 52. Each of the rotation reels 3, 4 and 5 has a rotation reel drum 53 having a peripheral surface to which the rotation reel band 54 is adhered. On the outer surface of the rotation reel band 54 is drawn a symbol row constituted by a plurality of different symbol marks. Each of the brackets 52 has attached thereto a stepping motor 55 enabling each of the rotation reels 3, 4 and 5 to be driven to rotate.

Figure 4:
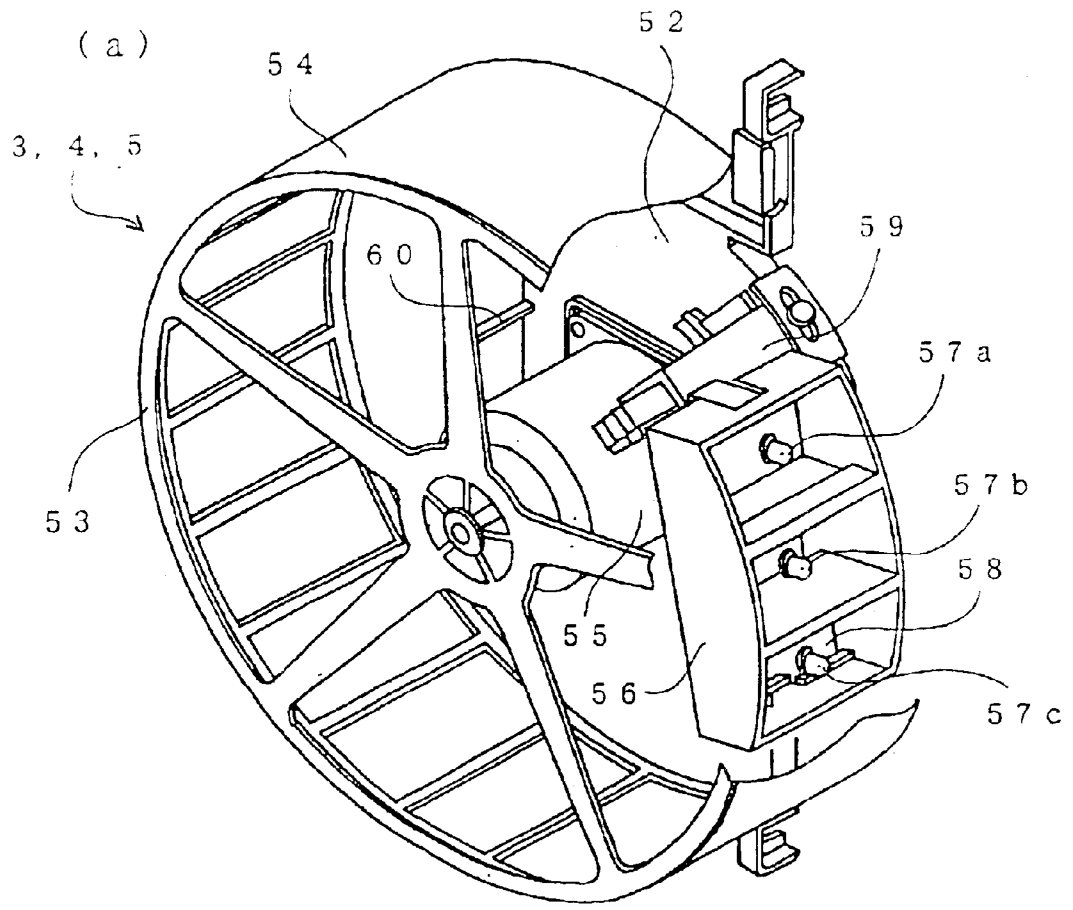
Figure 4:
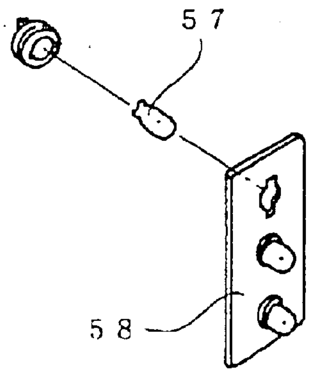

The construction of each of the rotation reels 3, 4 and 5 is particularly shown in FIG. 4(*a*). The constitutional elements and parts of each of the rotation reels 3, 4 and 5 shown in FIG. 4(*a*) substantially identical to those of each of the rotation reels 3, 4 and 5 in FIG. 3 are illustrated bearing the reference numerals of the rotation reels 3, 4 and 5 the same as those of the rotation reels 3, 4 and 5 in FIG. 3 and will therefore be omitted in description hereinafter. The rotation reel drum 53 behind the rotation reel band 54 has a lamp case 56 therein. In the lamp case 56 there are provided Back lamps 57*a*, 57*b*, and 57*c*. The back lamps 57*a*, 57*b*, and 57*c* are mounted on the base plate 58 as illustrated in FIG. 4(*b*). On the bracket 52 is mounted a photo sensor 59 which detects an light blocking plate 60 mounted on the rotation reel drum 53 passing through the photo sensor 59 as the rotation reel drum 53 makes a full rotation.

The light-on/off of each of the back lamps 57*a* to 57*c* is controlled by means of a lamp drive circuit 48 which will be described later. Each of the back lamps 57*a* to 57*c* individually illuminates the respective symbol mark drawn on the rotation reel band located in front, thereby enabling three symbol marks to be projected in the observation windows 6, 7 and 8.

Figure 5:
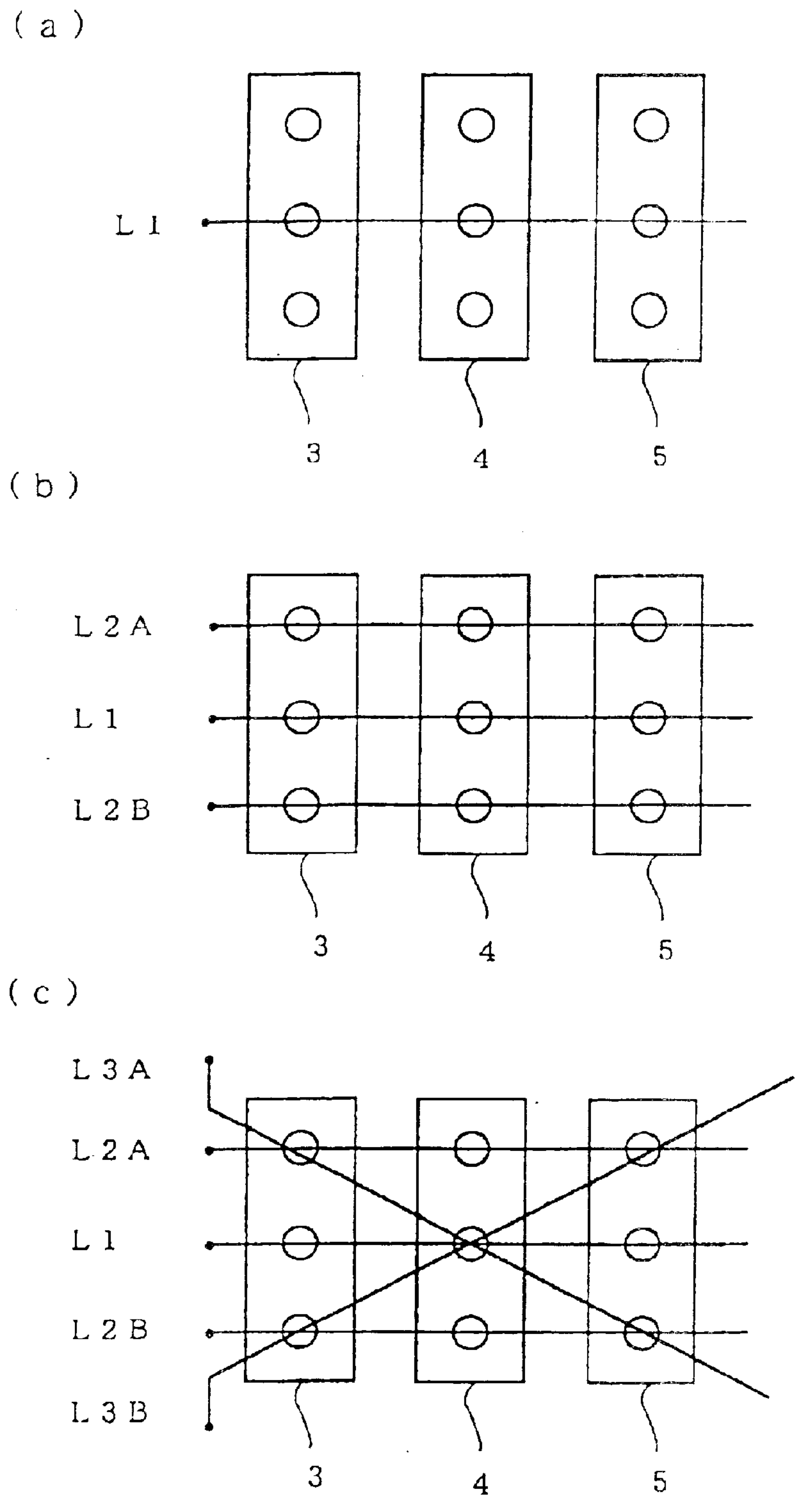

Observation windows 6, 7 and 8 have a plurality of prize winning lines in common respectively represented by lines in FIG. 1 including: a prize winning line L1 horizontally extending over the center of the area; a pair of prize winning lines L2A and L2B disposed on the upper and lower sides of the center prize winning line L1; and a pair of cross prize winning lines 13A and L3B crossed at oblique angles and traversing the prize winning lines L1, L2A and L2B. When the game player inserts one game medal into the medal inserting slot 9, only the center prize winning line L1 is made effective in betting as shown in FIG. 5(*a*). When the game player inserts two game medals into the medal inserting slot 9, the upper and lower prize winning lines L2A and L2B are made effective in betting in addition to the center prize winning line L1 as shown in FIG. 5(*b*). When the game player inserts three game medals into the medal inserting slot 9, all of the prize winning lines L1, L2A, L2B, L3A and L3B are made effective in betting as shown in FIG. 5(*c*).

The circles seen in FIG. 5 indicate symbol marks drawn on the rotation reels 3, 4 and 5. Effective line indicating lamps 23 (see FIG. 1) are disposed respectively at the ends of the prize winning lines. The respective effective line indicating lamp 23 is lighted on when any of the prize winning lines is made effective in betting, thereby allowing the game player to recognize the prize winning line to be effective in betting.

The slot machine 1 further comprises a 1 BET switch 10, and a 2 BET switch 11, a Max BET switch 12 arranged on the lower and left side of the observation windows 6, 7 and 8. The slot machine 1 includes a credit indication portion 13 on the upper side of the BET switches. If the credit indication portion 13 indicates that credit medals are available, instead of inserting game medals into the medal inserting slot, the game player can operate the 1 BET switch 10, the 2 BET switch 11, or the Max BET switch 12 to select one, two or three game medal(s) to be invested in betting, respectively. The credit indication portion 13 composes of 7-segment LEDs (light emitting diode) whose number is equal to the number of digits to be displayed and indicates the number of currently available credit medals.

The slot machine 1 further comprises a C/P (Credit/Payout selecting) switch 14 and a start lever 15 on the lower side of the BET switches 10 to 12 on the right side of the start lever 15. The game player can operate the C/P switch 14 to select play credit or pay out.

The operation of the start lever 42 causes the rotation reels 3, 4 and 5 to be driven to rotate simultaneously. The slot machine 1 further comprises stop buttons 16, 17, and 18 arranged corresponding to the rotation reels 3, 4 and 5 and collectively constituting shift and display stop means 72 (see FIG. 9) for selectively stopping the rotation reels 3, 4 and 5 per symbol row. When the rotation speed of each of the rotation reels 3, 4 and 5 reaches a constant speed, the stop buttons 16 to 18 are enabled to allow the game player to selectively stop the respective rotation reels 3, 4 and 5 from rotating.

In the embodiment according to the present invention, the stop and display control operation by means of the stop and display control means 73 is interrupted for a rotation reel firstly to be stopped from rotating (hereinafter referred to as "first stop rotation reel") and a rotation reel secondly to be stopped from rotating hereinafter referred to as "second stop rotation reel") for the specific winning state, for instance, small prize winning state during the CT period. That is, each of the first and second stop rotation reels will be immediately stopped from rotating at the timing when the, game player operates any of the respective stop buttons 16, 17 and 18 if the small prize winning state occurs during the CT period. On the other hand, the stop and display control means 73 performs the stop and display control operation for the remaining rotation reel thirdly to be stopped from rotating (hereinafter referred to as "third stop rotation reel") even during the CT period. In other words, the third stop rotation reel is still controlled with the result that the set of the symbol marks representative of the small prize winning state will be stopped and displayed in combination with the first and second stop rotation reels.

The slot machine 1 further comprises sound penetrating holes 19, a medal receptacle 20 and a medal paying-out opening 21 on the lower and front side of the front panel. The sound penetrating holes 19 outputs a sound produced by a speaker accommodated in the slot machine. The medal receptacle 20 catches and stores the game medals paid out through the medal paying-out opening 21. The slot machine 1 further comprises a divide indication portion 22 on the upper and front side. The divide indication portion 22 is designed to indicate information including a list of the number of game medals awarded for the respective winning prize.

The slot machine 1 further comprises a LCD 24 in the front panel 2 on the right side of the rotation reels 3, 4 and 5. The LCD 24 is designed to display various information on the game, e.g., the state of each of the rotation reels 3, 4 and 5 (i.e., rotating or being stopped), the game history, and entertaining images under a bonus game condition.

Figure 6:
FIG. 6 is a winning table showing the relationship between the winning state and the combination of the symbol marks.
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:

Referring now to FIG. 6, there are shown the contents of the divide indication portion indicating information including a list of a plurality of the sets of symbol marks representative of the winning states, and a list of the number of game medals awarded for the respective winning states. A BB (big bonus) game, i.e., a big-prize winning state occurs if three symbol marks of "white seven" are aligned with the rotation reels 3, 4 and 5 on any of the effective prize winning lines, and the number of the awarded game medals for the BB game is 15 under a regular game condition. A RB (regular bonus) game, i.e., a medium prize winning state occurs if three symbol marks of "black seven" are aligned with the rotation reels 3, 4 and 5 on any of the effective prize winning lines, and the number of the awarded game medals for the RB game is 15 under a regular game condition.

A small-prize winning state of "hat" prize is won if three symbol marks of "hat" are aligned with the rotation reels 3, 4 and 5 on any of the effective prize winning lines, and the number of the awarded game medals for the "hat" prize is 7 under a regular game condition and 9 under a BB game condition. A small-prize winning state of "cactus" prize is won if three symbol marks of "cactus" are aligned with the rotation reels 3, 4 and 5 on any of the effective prize winning lines, and the number of the awarded game medals for the "cactus" prize is 3 under both regular and BB game conditions.

A small-prize winning state of "upper sun half" prize is won if a symbol mark of "upper sun half" appears in the rotation reel 3 on any of the effective prize winning lines, and the number of the awarded game medals for the "upper sun half" prize is 1 under both regular and BB game conditions. A small-prize winning state of "lower sun half" prize is won if a symbol mark of "lower sun half" appears in the rotation reel 3 on any of the effective prize winning lines, and the number of the awarded game medals for the "lower sun half" prize is 7 under both regular and BB game conditions.

ARP (replay) prize is won if three symbol marks of "bird" are aligned with the rotation reels 3, 4 and 5 on any of the effective prize winning lines, and the number of the awarded game medals for the RP prize is 9 under a BB game condition but no game medal is awarded under the regular game condition.

Figure 7:
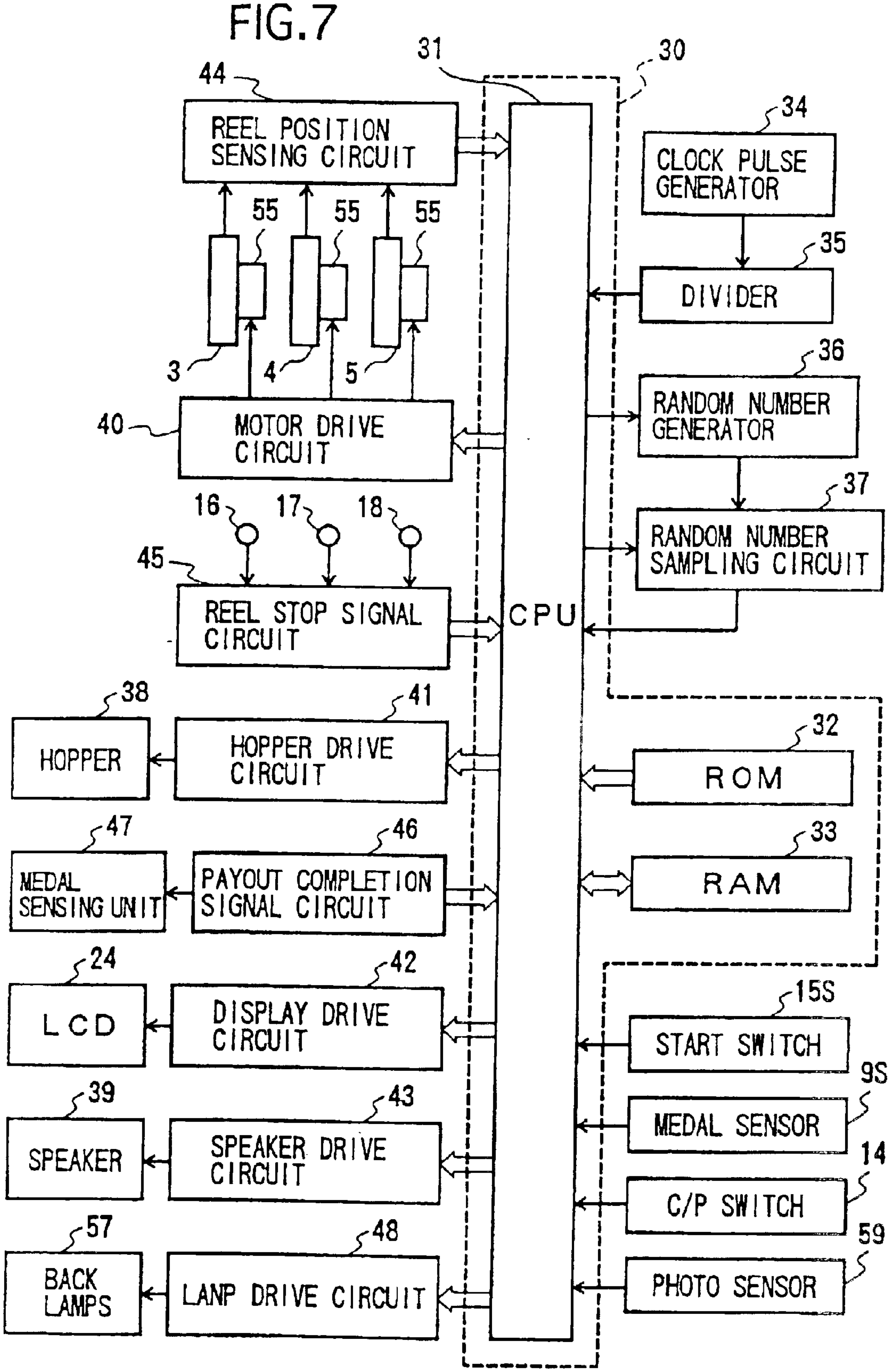
FIG. 7 is a block diagram showing a control circuit of the slot machine according to the present invention.

FIG. 7 shows an electric circuit which comprises control means for controlling the game processing operation of the slot machine 1 of the preferred embodiment according to the present invention, and the peripheral devices (actuators) electrically connected with the control means.

The control means is mainly constituted by a microcomputer 30, hereinafter referred to simply as "micom", and a plurality of circuits for sampling random numbers. The micom 30 has a CPU31 for performing control operations on the basis of a predetermined program, a ROM32 and a RAM33. The ROM32 and the RAM33 collectively constitute storage means. The storage means is designed to store table data having a plurality of predetermined reference values. The CPU31 is further connected with a clock pulse generator 34 for generating a base clock pulse, a divider 35, a random number generator 36 for generating random numbers divided into a plurality of random number segments, and a random number sampling circuit 37 for sampling a single number from the generated random numbers.

The micro 30 is operable to control the operations of the actuators e.g., stepping motors 55 for driving the rotation reels 3, 4 and 5, a hopper 38 for storing the game medals, the LCD 24, a speaker 39, and the back lamps 57 by means of control signals. The actuators are driven by a motor drive circuit 40, a hopper drive circuit 41, a display drive circuit 42, a speaker drive circuit 43, and a lamp drive circuit 48, respectively. The motor drive circuits 40, 41, 42 and 43, 48 are connected with the CPU 31 through I/O ports of the micom 30. Stepping motors 55 are energized in one/two-phase by the motor drive circuit 40 and each of the stepping motor 55 makes a full rotation with a 400-pulse drive signal.

The micro 30 is connected with sensors, including a start switch 15S for sensing the rocking operation of the start lever 15, a medal sensor 9S for sensing the insertion of the game medal(s), the aforesaid C/P switch 14, a photo sensor 59, and a reel position sensing circuit 44 for sensing the position of each of the rotation reels 3, 4 and 5 by receiving signals from the photo sensor 59.

The photo sensor 59 detects the light blocking plate 60 passing through the photo sensor 59 and thus generates a reset pulse as each of the rotation reel 4, 5 and 5 makes a full rotation. The thus generated reset pulse is transmitted to the CPU 31 through the reel position sensing circuit 44. The RAM 33 contains discrete values specifying position ranges of the rotation reels 3, 4 and 5, respectively. The CPU 31 is operated to clear the respective value contained in the RAM 33 to zero upon receiving a reset pulse from any of the rotation reels 3, 4, and 5, thereby enabling any error caused between the value stored in the RAM 33 specifying a position range of each of symbol marks being rotated and the actual position of each of the stepping motors 55 to be eliminated for a full rotation.

The micro 30 is further connected with a reel stop signal circuit 45 and a payout completion signal circuit 46. The reel stop signal circuit 45 and the payout completion signal circuit 46 collectively constitute input signal generation means. The reel stop signal circuit 45 is designed to generate a stop signal to have each of the rotation reels 3, 4 and 5 stopped from rotating in response to the operation of the stop buttons 16, 17, and 18, respectively. The payout completion signal circuit 46 is connected with a medal sensing unit 47 for counting the number of game medals paid out from the hopper 38. The payout completion signal circuit 46 is designed to output a payout completion signal to the CPU 31 when the number of the game medals actually paid out, which is input from the medal sensing unit 47, reaches a predetermined value of the dividend rate.

The data stored in the ROM 32 includes sequence programs for game process procedures performed in the slot machine 1. In addition, the data stored in the ROM 32 includes data tables such as a prize probability table, a symbol mark table, and a winning symbol combination table indicative of relationships between symbol mark sets and the respective prize winnings.

The prize probability table includes data indicative of relationships between segment ranges (hereinafter referred to as simply "segment") of the random numbers generated by the random number generator 36 and the respective prize winning states. The random number sampled by the random number sampling circuit 37 is assigned to the respective segment range representing the prize winning state in reference to the prize probability table. The data contained in the prize probability table is best shown in FIG. 8. The segments of the expected random numbers are shown in FIG. 8 as being represented by data rows of alphanumeric characters: a1–a3, b1–b3, c1–c3, d1–d3, e1–e3, f–f3, and g1–g3 in the data table. The random number sampled by the sampling circuit 37 is assigned to the respective prize winning state in reference to any of the data rows of the prize probability table. The data raw of "a1–g1" is referred to if one game medal is invested in betting, the data raw of "a2–g2" is referred to if two game medals are invested, and the data raw of "a3–g3" is referred to, if three game medals are invested.

Each of the aforesaid alphanumeric characters specifies a value. The values, usually defined in the ascending order of size, i.e., a<b<c<e<d<e<f<g, represent the respective segments representative of the prize winning states as shown in FIG. 8. The sampled random number not greater than d causes the prize winning state determining means to request the small prize wining state (small hit). In other words, in response to the sampled random number less than a, the prize winning state determining means sets up the "lower sun half" prize winning request flag, in response to the sampled random number not less than a but not greater than b, the prize winning state determining means sets up the "upper sun half" prize winning request flag, in response to the sampled random number not less than b but not greater than c, the prize winning state determining means sets up the "cactus" prize winning request flag, in response to the sampled random number not less than c but not greater than d, the prize winning state determining means sets up the "hat" prize winning request flag, and in response to the sampled random number not less than d but not greater than e, the prize winning state determining means sets up the RP (replay) prize winning request flag. The sampled random number not less than e but not greater than f causes the prize winning state determining means to request the medium prize winning state (medium hit). In response, the prize winning state determining means sets up the RB prize winning request flag. The sampled random number not less than f but not greater than g causes the prize winning state determining means to request the big prize winning state (big hit). In response, the prize winning state determining means sets up BB prize winning request flag. The sampled random number greater than g causes the prize winning state determining means to request no-prize winning state (no hit). In response, the prize winning state determining means sets up no-prize winning request flag. From the foregoing description, it is thus to be noted that the winning states include small, medium and big prize winning states.

As described hereinbefore, the segment of the prize probability table that the sampled random number belongs determines the prize winning state. The random number generator 36, the random number sampling circuit 37, the winning probability table, and the micom 30 collectively constitute the winning state determining means 74 (see FIG. 9). The winning state determining means 74 is designed to determine the winning state of the game player on the basis of the sampled random number 75 using the reference values of the table data stored in the storage means, and then sets up the appropriate prize winning request flag.

The symbol mark table is best shown in FIG. 10. Each of the symbol marks is represented by a symbol code (alphabetic character). Each of the positions of the rotations reels 3, 4 and 5 is represented by a code number. More specifically, the code numbers are allocated to the outer surface of each of the rotation reels 3, 4 and 5 equidistantly spaced apart from one another with reference to the position at which the aforesaid reset pulse is generated. The symbol mark table is indicative of relationships between the code numbers representing the positions of each of the rotation reels 3, 4 and 5 and the symbol codes representing the respective symbol mark.

The winning symbol combination table includes a plurality of predetermined sets of symbol codes (symbol marks) and the numbers of game medals awarded for the respective winning states, both of which will be indicated in the divide indication portion 22. The winning symbol combination table further includes a plurality of predetermined sets of symbol codes (symbol marks) representative of "li-zhi" state for notifying the game player that that a prize winning request is set for a special game condition, and winning prize combination codes for indicating each of the winning prizes. At the times when any of the rotation reels 3, 4 and 5 is stopped from rotating, and when the all of the rotation reels 3, 4 and 5 are stopped from rotating, the winning prize is confirmed with reference to the winning symbol combination table.

The reel position sensing circuit 44, the reel stop signal circuit 45, the motor drive circuit 40, the stepping motor 55, and micom 30 collectively constitute stop and display control means 73 (see FIG. 9) for stopping and displaying the sets of symbol marks representative of the prize winning request flag set by the winning state determining means 74. The stop and display control means 73 senses the operation timing of the shift and display stop means 72 by the reel stop signal circuit 45, and if it is turned out that the set of the symbol marks representative of the prize winning request flag are not to be displayed on any of the effective prize winning lines, however, if the concerned symbol mark associated with the prize winning request flag is located within four symbol marks to be displayed subsequently, the stop and display control means 73 controls the concerned rotation reel with the result that the concerned rotation reel will be stopped from rotating at an appropriate time, thereby enabling the target set of the symbol marks to be stopped and displayed on any of the effective prize winning lines of the observation windows 6, 7 and 8. More specifically, the micom 30 is operated to predict the symbol marks to be displayed in the observation window 6, 7 and 8 by means of the reel position sensing circuit 44, and thus control the motor drive circuit 40 and the stepping motor 55, thereby enabling the rotations of the rotation reels 3, 4 and 5 to be stopped from rotating at an appropriate time.

The micom 30 also constitutes flag void means 76 and stop control interruption means 77 as shown in FIG. 9. The flag void means 76 is designed to void a specific prize winning request flag set by the winning state determining means 74 with a certain condition completed. In the preferred embodiment, the flag void means 76 is designed to void the small prize winning request flag when the segment which the random number sampled by the lottery action belongs to determines a CT period, which will be described later. This means that no prize winning state is requested under the CT period. The specific prize winning request flag is voided in the manner that the small prize winning request flag is replaced with the no-prize winning request flag performed in the steps S154 and S155 shown in FIG. 14 which will be described later. As a consequence, the small prize winning request flag is void during the CT period even if the small prize winning state should be determined by the winning state determining means 74, thereby making impossible for the game player to win the small prize winning. This means that the game player plays the game betting only on the bonus (BB and RB) prize and RP (replay) prize winning in lieu of the small prize winning during the CT period.

The stop control interruption means 77 is designed to interrupt the stop and display control to stop and display the set of symbol marks representative of the specific void prize winning request flag for the first and second stop rotation reels in accordance with a predetermined requirement under the aforesaid condition(s) completed. The predetermined requirement of the preferred embodiment is that either of the earlier one is not yet fulfilled; whether the predetermined times of the game has been played or that the predetermined number of game medals have been paid out. The stop control operation by the stop and display control means 73 is interrupted as long as the aforesaid requirement is met. More specifically, the CT period continues 150 games after the BB game is over, however, the CT period will end if 20 game medals are paid out even before 150 games have been played.

The operation of the micom 30 of the preferred embodiment according to the present invention will be described hereinafter.

The micom 30 is operated to control the game machine having the steps shown in FIGS. 11 and 12 as follows.

As a result of a previous play, replay is requested. Firstly, the judgment is made by the CPU 31 on whether an automatic game medal investing request is set or not (see FIG. 11, step S101,). When it is judged that the request is made, the step S101 proceeds to the step S102 wherein a predetermined investing process is performed to automatically invest the game medal(s) of the number requested by the game player for betting (S102). The step S102 then proceeds to the step S104. When the judgment is made by the CPU 31 in the step S101 that no automatic game medal investing request is made, the step S101 proceeds to the step S103 of waiting for either a signal from the medal sensor 9S for having sensed the insertion of the game medal(s) into the medal inserting slot 9 or a signal from the BET switch 10, 11, or 12 for having game medal(s) invested in betting (S103). The game player can invest up to 3 game medals under a regular game condition and one game medal under a bonus (BB or RB) game condition. After the game medal(s) are invested, the step S103 proceeds to the step S104.

In the step S104, the judgment is made by the CPU 31 on whether the start lever 42 is operated or not, on the basis of an input signal transmitted from the start switch 61 (S104). When the judgment is made by the CPU 31 that the start lever 42 is operated, the step S104 proceeds to the step S105 wherein the judgment is made by the CPU 31 on whether 4.1 sec. have elapsed or not after the previous game (S105). When the judgment is made by the CPU 31 that 4.1 sec. have not elapsed yet, the step S105 proceeds to the step S106 wherein a time waiting process is performed to wait until 4.1 sec. elapse (S106). When 4.1 sec. is over, the winning state is determined by the winning state determining means 74, i.e., the control goes to the steps S107 and S108 wherein a random number is sampled by the random number sampling circuit 37 (S107), and then a probability lottery process is performed (S108.)

Figure 13:
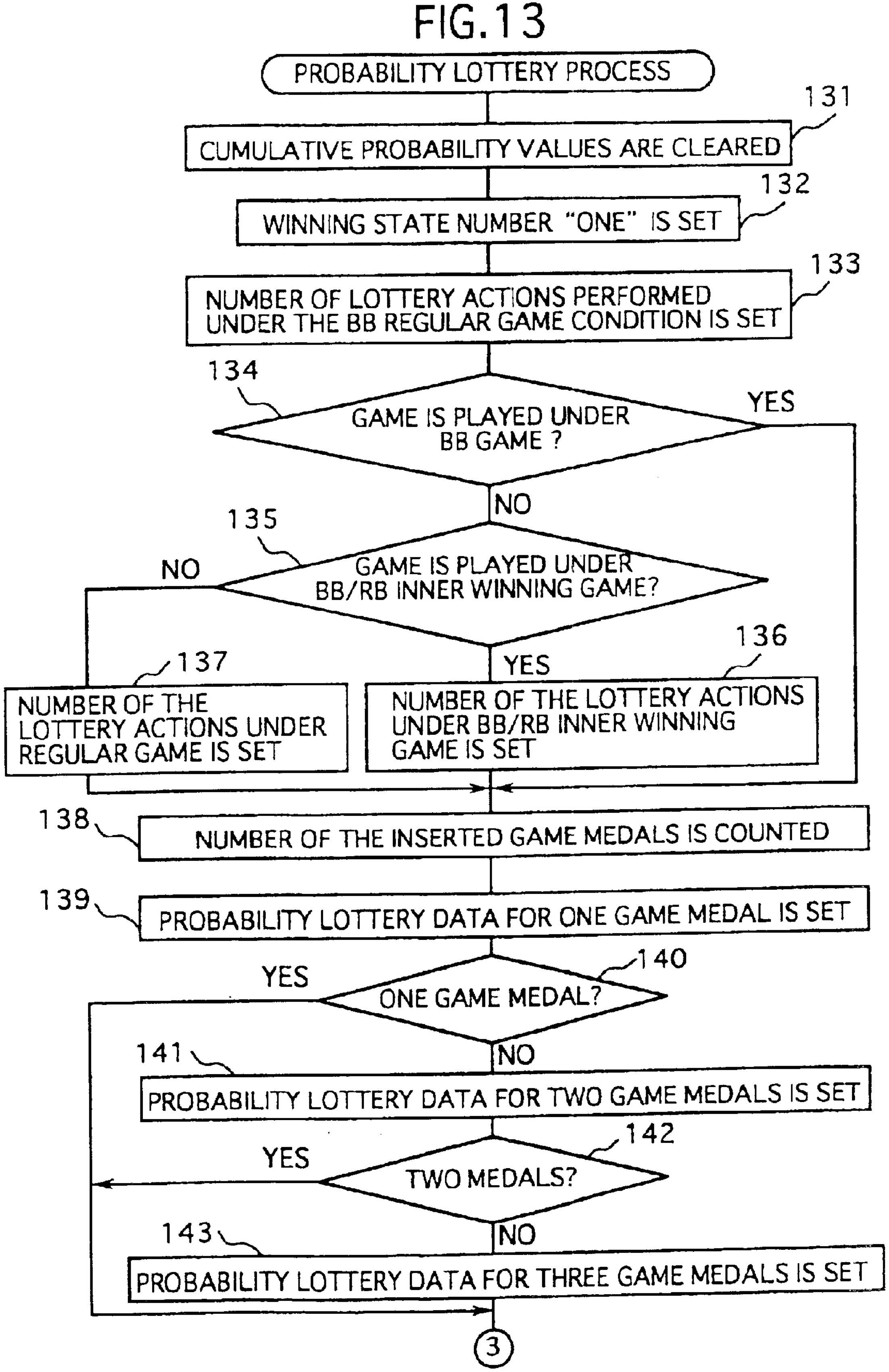
FIG. 13 is a first flow chart to be used for particularly explaining a probability lottery in FIG. 11 performed in the process of the processing unit forming part of the slot machine according to the present invention.
Figure 14:
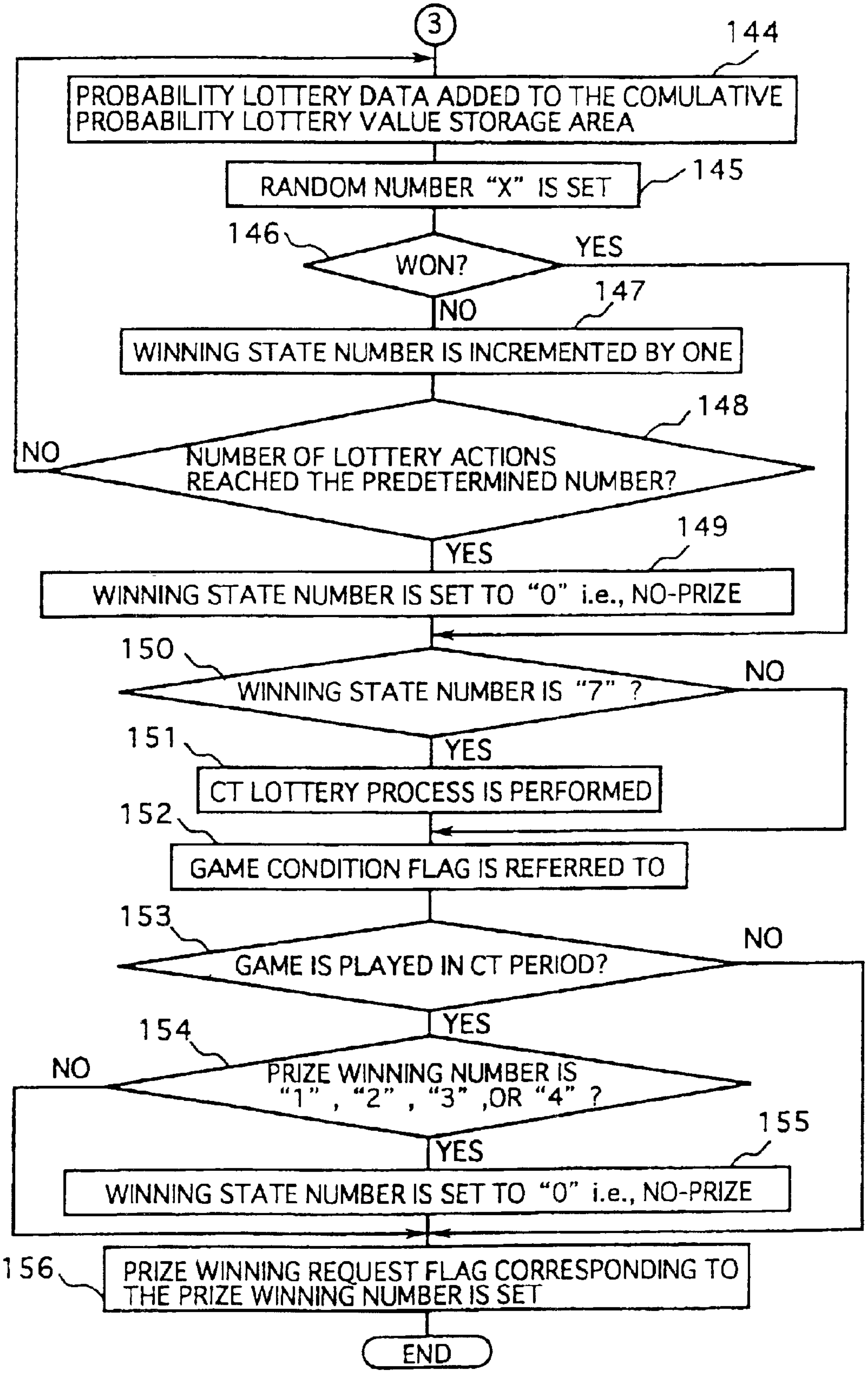
FIG. 14 is a second flow chart to be used for particularly explaining a probability lottery in FIG. 11 performed in the process of the processing unit forming part of the slot machine according to the present invention.

In the probability lottery process, the CPU 31 searches the segment of the prize probability table the random number sampled by the random number sampling circuit 37 belongs to (see FIG. 8). Referring to FIGS. 13 and 14 of the drawings, there are shown flowcharts of the probability lottery process. Firstly, a cumulative probability lottery value storage area in the RAM 33 is cleared (see FIG. 13, S131). Then, a winning state number "one" is set in a winning state number storage area (S132). The winning state number "one" is stated in a lottery data table specific to the game-condition, representing "lower sun half" prize winning state as shown in FIG. 15.

The numbers of lottery actions, winning prizes and the respective order numbers are described for each of the game conditions such as regular game, BB, RB inner winning, BB regular game, and CT period conditions. As shown in FIG. 15 of the drawings, under the regular game condition, the number of lottery actions is 7, the possible winning prizes are "lower sun half", "upper sun half", "cactus", "hat", "replay", "RB", "BB without CT", and "BB with CT", and their respective order numbers are "1" to "8", respectively. The winning state numbers represent the respective order numbers in the table in FIG. 15, e.g., the order number "1" is equal to the winning state number "1". Furthermore, under the BB, RB inner winning, BB regular game conditions, the number of lottery actions is 5, the possible winning prizes and the respective order numbers are as described in the table in FIG. 15. There is provided neither winning prize nor order number for RB, CT without BB and CT with BB winning prizes. The CT period condition belongs to the regular game condition. This means that the number of lottery actions, the winning prizes and the respective order numbers in the CT period are identical to those under the regular game condition. On the other hand, small prize winnings are void in the CT period, thereby resulting in that the winning prizes representative of the small prize winning state are omitted.

In the step S133, the number of lottery actions under the BB regular game condition (5) is set in the lottery-action storage area of the RAM33 (S133). In the step S134, the judgment is made by the CPU 31 on whether the current game condition is the BB game condition or not on the basis of a game condition flag, which will be described later, and when the judgment is made by the CPU 31 that the current game condition is the BB game condition, the control proceeds to the step S138 (S134). In the step S135, the judgment is made by the CPU 31 on whether the current game condition is the BB/RB inner winning game condition or not (S135). When the judgment is made by the CPU 31 that the current game condition is the BB/RB inner winning game condition, the step S135 proceeds to the step S136 wherein the number of the lottery actions under the BB/RB inner winning game condition (5) is set in the lottery action storage area (S136), and if the judgment is made by the CPU 31 that the current game condition is not the BB/RB inner winning game condition, the step S135 proceeds to the step S137 wherein the number of the lottery actions under the regular game condition (7) is set in the lottery action storage area (S137). Here, the regular game condition includes the CT period.

The number of the inserted game medals is then counted (S138), and a plurality of probability lottery data for one game medal, i.e., a plurality of probability lottery data of "a1" to "g1" shown in FIG. 8 is set in the probability lottery data storage area in the RAM33 (S139). In the step S140, the judgment is made by the CPU 31 on whether the number of the inserted game medals is one or not (S140), and if the judgment is made by the CPU 31 that the number of the inserted game medals is one, the step S140 proceeds to the step S144, which will be described later. Otherwise, the step S140 proceeds to the step S141 wherein a plurality of probability lottery data for two game medals i.e., a plurality of probability lottery data of "a2" to "g2" shown in FIG. 8, are set in the probability lottery data storage area in the RAM33 (S141). In the step S142, the judgment is made by the CPU 31 on whether the number of the inserted game medals is two or not (S142), and if it the judgment is made by the CPU 31 that the number of the inserted game medals is two, the step S142 proceeds to the step S144, which will be described later. Otherwise, the step S142 proceeds to the step S143 wherein a plurality of probability lottery data for three game medals i.e., a plurality of probability lottery data of "a3" to "g3" shown in FIG. 8, are set in the probability lottery data storage area in the RAM33 (S143):

In the step S144, each of the set probability lottery data is added to the cumulative probability lottery value storage area in the RAM 33 (see FIG. 14, S144). Firstly, "aw" (i.e., a1, a2, or a3) of the set probability lottery data is added to the cumulative probability lottery value storage area. Then, the subsequent probability lottery data of "bw", "cw", "dw", "ew", "fw", and "gw" are added to the cumulative probability lottery value storage area in the alphabetical order one by one at each time when the control is returned from the step S148, which will be described later, and the step S144 is repeated. "aw", "bw", "cw", "dw", "ew", "fw", and "gw" represent the size of the respective segments in the prize probability table, i.e., aw=a,bw=b-a,cw=c-b,dw=d-b, ew=e-d,fw=f-e,and gw=g-f When the step S144 is performed for the first time, the probability lottery data value results "aw", accordingly a cumulative probability lottery value, D is aw.

In the step S145, the random number "X" sampled by the random number sampling circuit 37 is substituted into the formula of "X - D" (S145). In the step S146, the winning state is determined on the basis of the value of X - D (S146). More specifically, the judgment is made by the CPU 31 on whether the value of X-D is positive or negative, and if the judgment is made by the CPU 31 that the value is negative, i.e., the random number X is less than the cumulated value D, the random number X is judged to belong to the winning state associated with the segment of the probability lottery data. If the judgment is made by the CPU 31 that the value is negative, the step S146 proceeds to the step S150. For instance, the cumulative probability lottery value, D is "aw" at the first time of the probability lottery process, and if the judgment is made by the CPU 31 that the value is negative in the step S146, it is determined that the of the lottery indicates the winning state associated with the segment "a", i.e., the "lower sun half" winning state, and the step S146 proceeds to the step S150.

In the step S146, if the judgment is made by the CPU 31 that the value is positive, the step S146 proceeds to the step S147 wherein the winning state number stored in a winning state storage area is incremented by one (S147). For instance, one has been set in the winning state number storage area in the step S132, thereby causing the winning state number to increase by one to "two" at the first time of the probability lottery process in the step S146. Referring to the table shown in FIG. 15, it can be seen that the winning state number "two" is indicative of the "upper sun half". In this manner, the winning state number is incremented one by one at each time when the step S146 proceeds to the step S147. Then, the step S147 goes to the step S148 wherein the judgment is made by the CPU 31 on whether the number of the lottery actions reaches the predetermined number stored in the lottery action storage area (S 148).

If the judgment is made by the CPU 31 that the number of the lottery actions does not reach the predetermined number, the control goes back to the step S144 wherein the next probability lottery data, "bw" is added to the cumulative probability lottery value storage area. X - D is calculated and the judgment is made by the CPU 31 on whether the value of X - D is negative or not in the steps S145 and S146. When bw is added to the cumulative probability lottery value, D, D=aw+bw. If the judgment is made by the CPU 31 that the value of X-D is negative in this time, the sampled random number is judged to belong to the winning state associated with the +segment "b", i.e., "upper sun half" prize, and the step S146 proceeds to the step S150.

In the step S146, if the judgment is made by the CPU 31 that the value is positive in the step S146, the step S146 proceeds to the step S147 wherein the winning state number is incremented by one, and thus the winning state number results three (S147). The step S147 goes to the step S148 wherein the judgment is made by the CPU 31 on whether the number of the lottery actions reaches the predetermined number stored in the lottery action storage area (S148). If the judgment is made by the CPU 31 that the number of the lottery actions does not reach the predetermined number, the control goes back to the step S144 wherein the aforesaid procedure is repeated.

In the step S148, if the judgment is made by the CPU 31 that the number of the lottery actions reaches the predetermined number stored in the lottery action storage area, the sampled random number X is regarded to be greater than the upper limit value of the cumulative probability lottery value D, and thus, not to belong to any one of the segments representative of the prize winning states. Accordingly, the result of the lottery indicates no-prize winning, and the winning state number "0" representing no-prize winning state is set (S149).

The process performed in the steps S144 to S148 will be described in detail hereinafter. The following conditions are assumed: the range of the sampled random numbers used is 0 to 16384, three game medals are invested in bet. Referring to FIG. 16 of the drawings, there is shown an example of the prize probability table used when three game medals are invested in betting.

Assuming that, the random number, 4150, is sampled, i.e., X=4150. D=1200 (i.e., "aw", the size of the segment representative of "lower sun half" prize) results at the first time of the probability lottery process (S144). Accordingly, a value of X-D is calculated as follows (S145).

$$4150-1200=2950 \tag{1}$$

The judgment is made by the CPU 31 that the value of X-D is positive (S146), and one is added to the winning state number, "I". The winning state number results 2 at this time (S147). The number of lottery actions is 7 under the regular game condition, thereby enabling the lottery action to continue (S148) and the step S148 to go back to the step S144. Thus, the probability lottery process repeats in the same manner. Namely, "bw", the size of the segment representative of "upper sun half" prize, is added to the cumulative probability lottery value D. D=1200+1100=2300. The value of X-D is calculated.

$$4150-2300=1850 \quad (2)$$

The judgment is made by the CPU 31 that the value of X-D is positive; the winning state number, "2" is incremented by one. The winning state number results 3 at this time. The number of lottery actions does not reach the predetermined number, thereby enabling the lottery action to continue and the probability lottery process to repeat. Namely, "cw", the size of the segment representative of "cactus" prize, is added to the cumulative probability lottery value D. D=2300+1800=4100. The value of X-D is calculated.

$$4150-4100=50 \quad (3)$$

The judgment is made by the CPU 31 that the value of X-D is positive; the winning state number, "3" is incremented by one. The winning state number results 4 at this time. The number of lottery actions does not reach the predetermined number, thereby enabling the lottery action to continue and the probability lottery process to repeat. Namely, "dw", the size of the segment representative of "hat" prize, is added to the cumulative probability lottery value D. D=4100+250=4350. The value of X-D is calculated.

$$4150-4350=-200 \quad (4)$$

The judgment is made by the CPU 31 that the value of X-D is negative. The winning state number is determined "4". The winning state is judged to belong to the small-winning prize associated with the segment of the probability lottery data "d", i.e., "hat" prize.

Then, the judgment is made by the CPU 31 on whether the winning state number is 7 or not, i.e., "BB without CT" prize is won or not (S150). If the judgment is made by the CPU 31 that the "BB" prize is won, the step S150 proceeds to the step S151 wherein the CT lottery process is performed, i.e., judgment is made by the CPU 31 on whether the CT game play is to be performed or not (S151). The CT lottery process is performed in the same manner as the aforesaid probability lottery process on the basis of the random number sampled by the random number sampling circuit 37. The CT game prize winning state is judged by comparing the sampled random number with the predetermined value. That is, if the judgment is made by the CPU 31 that the sampled random number is less than the predetermined value, the CT game prize winning state is determined and the winning state number, "8" is set. The CT game prize winning state corresponds to the CT game condition. On the other hand, if the judgment is made by the CPU 31 that the sampled random number is not less than the predetermined value, the winning state number, "7" remain.

In the preferred embodiment, the CT lottery process is performed separately from the probability lottery process. However, if a new segment representative of the "BB with CT", winning state is added to the table with the result that winning state number "8" is made in FIG. 16, the CT lottery process can also be performed in the probability lottery process routine (the steps S144 to S149) and the steps S150 and S151 can be omitted.

Then, a game condition flag, which will be described later, is referred to (S152), and the judgment is made by the CPU 31 on whether the current game condition is the CT period or not (S153). If the judgment is made by the CPU 31 that the current game condition is the CT period, the step S153 proceeds to the step S154 wherein the judgment is made by the CPU 31 on whether the prize winning number is any number of "1", "2", "3", and "4, or not, i.e., the prize winning number corresponds to the small prize winning state or not (S154). If the judgment is made by the CPU 31 that the prize winning number corresponds to the small prize winning state, the prize winning number "0", which represents no-prize winning state, is set (S155). Accordingly, the small prize winning state will be void, although the small prize winning state should be requested as a result of the probability lottery process. This leads to the fact that only the Bonus (BB, RB) prize winning number and replay prize winning number are determined during the CT period.

In the step S156, the prize winning request flag representative of the prize winning number is set (S1156). In other words, there are provided eight types of the winning request flags such as "lower sun half", "upper sun half", "cactus", "hat", "replay", "RB", "BB without CT", and "BB with CT". One of the aforesaid winning request flags is set in the predetermined area of the RAM33. If no winning request flag is set, "no-prize" results. As described hereinbefore, the "BB without CT" prize winning request flag is set if the BB inner winning state is determined and then, the CT game condition is not determined as results of the lottery process. "BB with CT"prize winning request flag is set if the BB inner winning state is determined and then, the CT game condition is not determined as results of the lottery process.

Figure 11:
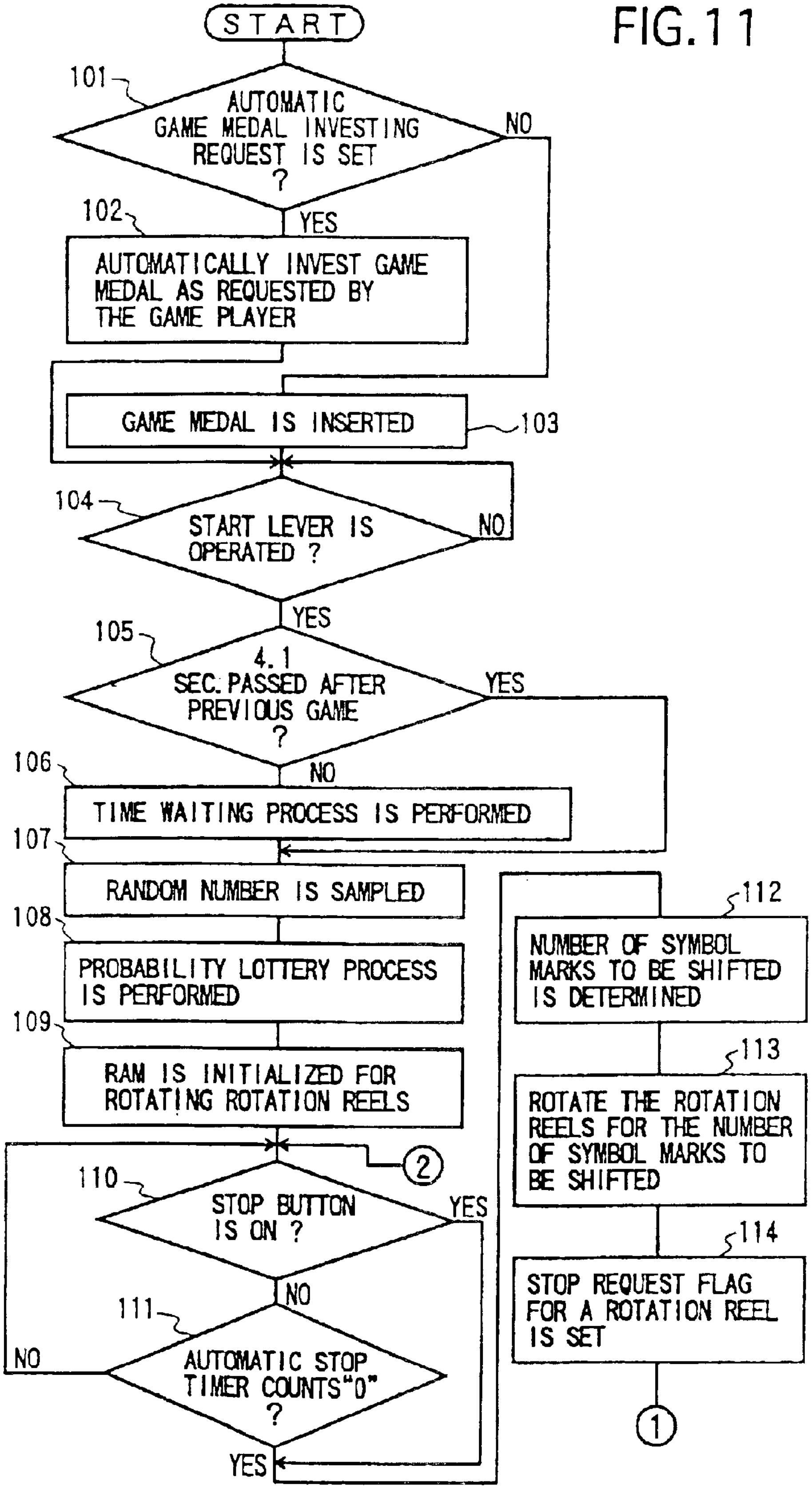
FIG. 11 is a first flow chart to be used for explaining the process of the processing unit forming part of the slot machine according to the present invention.

Up to this point, the probability lottery process performed in the step S108 in FIG. 11 has been described. A rotation reel position storage area of the RAM33, which each of the positions of the rotation reels 3, 4 and 5 is written in, is initialized when the rotation reels start rotating. Then, the rotation reels 3, 4 and 5 are driven to rotate by the stepping motors 55 (see FIG. 11, S109). The step S109 proceeds to the step S110 wherein the judgment is made by the CPU 31 on whether any of the stop buttons 16 to 18 is turned on or not (S110). If the judgment is made by the CPU 31 that no stop button is turned on, the step S110 proceeds to the step S111 wherein the judgment is made by the CPU 31 if an automatic stop timer counts 0 or not (S111). The automatic stop timer is operated to automatically stop each of the rotation reels 3, 4 and 5 from rotating if any of the respective stop buttons 16 to 18 has not been operated for the predetermined period.

If any of the stop buttons 16 to 18 is turned on, or the automatic stop timer counts 0, the control goes to the step S112 wherein the number of symbol marks to be shifted by the stop and display control means 73 is determined (S112). On the basis of the number determined in the step S112, the stop and display control means 73 shifts the symbol marks so that the set of the symbol marks representative of the target prize winning state will be stopped and displayed on an effective prize winning line of the observation window. The number of symbol marks to be shifted is determined according to the game condition, the prize winning request, the number of symbol marks to be controlled, and the positions of symbol marks, etc.

The game conditions are stored in a one-byte area of the RAM33, which is called a game condition state (i.e., game condition flag) storage area, as shown in FIG. 17(*a*). The current game condition is indicated by any of hexadecimal numbers of 01 to 16. The game condition state storage area includes six types: "RB operation", "BB operation", "regular game operation", BB inner winning operation", "RB inner winning operation", and "CT period".

The term "RB operation" is intended to mean that the game is being played in the regular bonus game condition, i.e., the game player can play a bonus game composed of a set of games with a plurality of predetermined high dividend rates. "BB operation" means that the game is being played in the big bonus game condition, i.e., the game player can repeatedly play a set of the regular game and the aforesaid bonus games. "Regular game operation" means that the game is played in neither of the aforesaid BB nor RB.

The "BB inner winning operation" is intended to mean that although the BB prize winning request flag is set, the set of the rotation reels 3, 4 and 5 corresponding to a predetermined set of symbol marks are not stopped. Accordingly, the "BB inner winning operation" means that although the BB prize winning request flag is set, the game is being played not in the BB game condition but still in the regular game condition. The "CT period" means that the game is played in the condition in which only the Bonus (BB, RB) prize winning state and replay prize winning states will be determined but the small prize winning state will be void.

Prize winning requests are also stored in a one-byte area of the RAM33, which is called a prize winning request flag storage area, as shown in FIG. 17(*b*). For instance, if 1 is set in bit 7 of the storage area, the prize winning request flag of "BB without CT" is set, and if 1 is set in bit 6, the prize winning request flag of "RB" is set. Two prize winning request flags may be set concurrently. For instance, if the BB prize winning request flag or the RB prize winning request flag is set, but the set of the rotation reels 3, 4 and 5 corresponding to a predetermined set of symbol marks are not stopped this time, the BB or RB prize winning request flag will remain for the next game play. If the small prize winning state is determined by the winning state determining means 74 in the subsequent play, the small prize winning request flag and the BB or RB prize winning request flag are set concurrently.

Tables as shown in FIG. 18 stored in the RAM 33 includes the number of symbol marks to be controlled, and the priority orders of the respective symbol marks. The shift control priority table in the regular game condition is shown in FIG. 18(*a*). The shift control priorities are assigned to the respective prize winning states in the order of replay, small prize, BB/RB prize in the regular game condition. In the case of two prize winning states are concurrently requested, or no-prize winning state is requested by the winning state determining means, the rotation reels 3, 4 and 5 are controlled so that the set of symbol marks representative of the prize winning state with the higher shift control priority will be stopped and displayed. The number of symbol marks to be controlled means the maximum number of symbol marks that can be shifted by the stop and display control means. Pour is assigned for the number of symbol marks to be controlled for each prize winning state in the regular game condition.

The shift control priority table in the CT period is shown in FIG. 18(*b*). If the small prize winning state is requested in the CT period, the rotation reels 3, 4 and 5 are controlled in the priority order of "hat", "cactus", "upper sun half", and "lower sun half" prize winning states. The small prize winning request flags are void in the CT period, thereby resulting in that the rotation reels 3, 4 and 5 are controlled by the stop and display control means 73 solely on the basis of the shift control priority table, i.e., the rotation reels 3, 4 and 5 are not controlled in the same manner as in the regular game condition. As of the number of symbol marks to be controlled, one is assigned for "hat" and "cactus" prize winning states, zero is assigned for "upper sun half" and "lower sun half" prize winning states. Zero means that rotation reels 3, 4 and 5 are not controlled.

The positions of symbol marks are stored in the rotation reel position storage area of the RAM33, which has been initialized in the step S109. The positions of symbol marks appeared at the time on any of the respective prize winning lines are shown with respective symbol numbers in FIG. 10.

In the step S112, the number of symbol marks to be shifted is determined. The process performed in the S112 will be described in detail hereinafter. Firstly, the current game condition is checked, and then the priority table specific to the game condition is selected. That is, the table in FIG. 18(*a*) is selected in the regular game condition, and the table in FIG. 18(*b*) is selected in the CT period. Secondly, the number of symbol marks to be controlled is determined on the basis of the selected table. Thirdly, the current positions of symbol marks are checked and the current symbol mark of the first stop rotation reel appeared on any of the effective prize winning lines is detected. If the current symbol mark of the first stop rotation reel does not correspond to the prize winning state, the judgment is made by the CPU 31 on whether the target symbol mark to be stopped and displayed on any of the effective prize winning lines is located within the determined number of symbol marks to be controlled. If the judgment is made by the CPU 31 that the target symbol mark is located within the number of symbol marks to be controlled, the number of symbol marks located between the target symbol mark and the symbol mark currently located on any of the effective prize winning lines is defined as the number of symbol marks to be shifted.

Fourthly, the number of symbol marks to be shifted is stored in the appropriate storage area of the RAM33, and the first stop rotation reel is rotated for the number of symbol marks to be shifted on the basis of the data information stored in the RAM33 (see FIG. 11, S113). On the other hand, the stop and display control operation is interrupted for the first and second stop rotation reels. This leads to the fact that the steps S112 and S113 are not performed in the CT period. In the step S114, a stop request flag for the first stop rotation reel is set (S114). The stop and display control means 73 controls to stop the respective rotation reel from rotating on the basis of the set stop request flag (S114).

Figure 12:
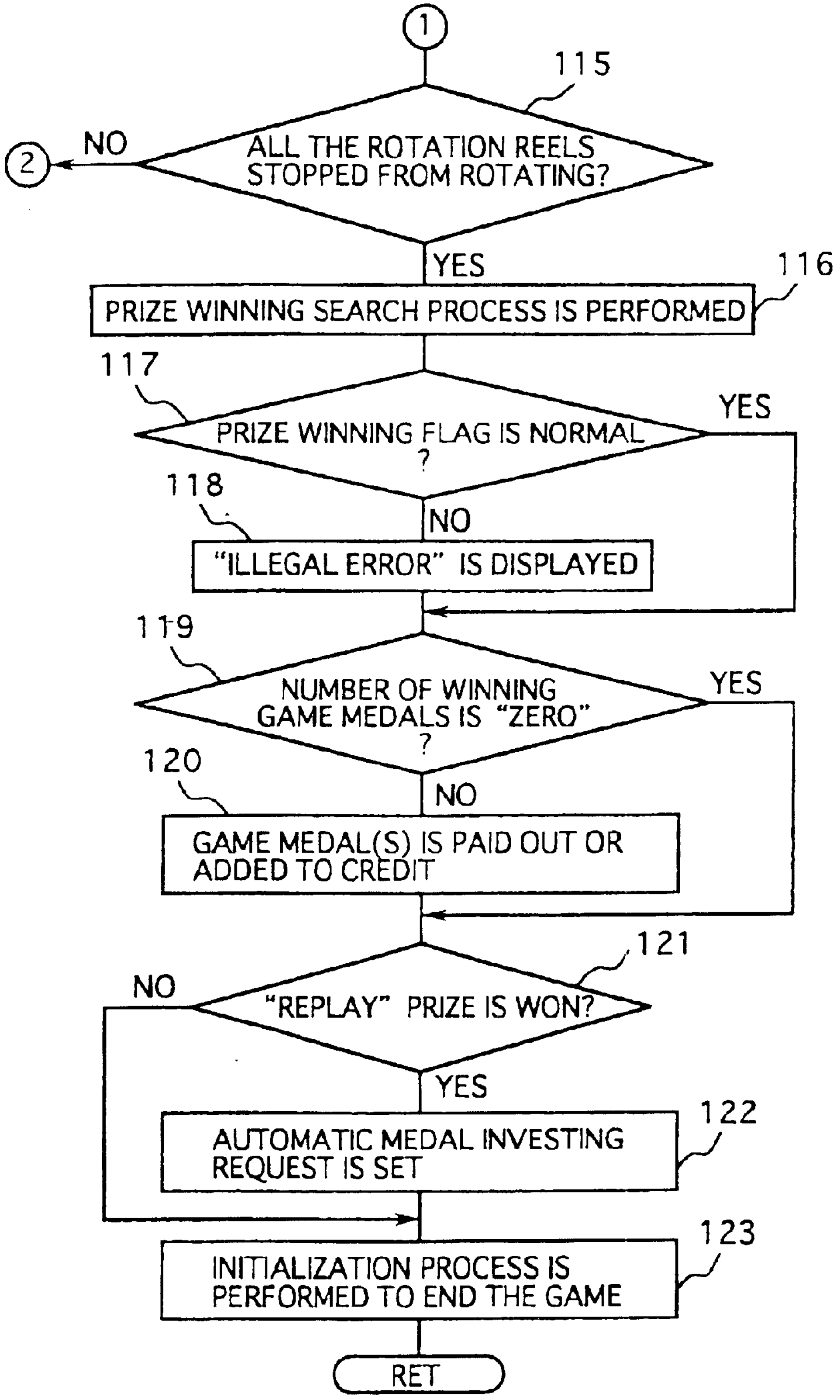
FIG. 12 is a second flow chart to be used for explaining the process of the processing unit forming part of the slot machine according to the present invention.

The step S114 proceeds to the step S115 wherein the judgment is made by the CPU 31 on whether all the rotation reels have stopped from rotating (see FIG. 12, S115). If the judgment is made by the CPU 31 that the second and third rotation reels are still rotating, the control goes back to the step S110 and the aforesaid process repeats.

An example of the reel stop process performed by the stop and display control means 73 in the steps S110 to 115 will be described in detail hereinafter.

For instance, when the judgment is made by the CPU 31 that the first rotation reel stop button 16 is turned on, the number of drive pulses supplied to the stepping motor 55 for the first rotation reel 3 at the time of the operation of the reel stop button 16 by the game player is read from the RAM33, and the position of the first rotation reel 3 is determined. Then, with reference to the determined position of the first rotation reel 3, the three symbol marks appeared on the observation window 6 are determined using symbol codes on the basis of the symbol table (see FIG: 10).

For instance, if the big prize winning request flag is set, the judgment is made by the CPU 31 on whether any of the symbol marks associated with the big prize winning state is located on any of the effective prize winning lines of the observation window 6. Also, if the medium prize or small prize winning request flag is set, the judgment is made by the CPU 31 on whether any of the symbol marks associated with the medium prize or small prize winning state is located on any of the effective prize winning lines of the observation window 6 in the same manner. If the judgment is made by the CPU 31 that the target symbol mark associated with the concerned prize winning state is located on any of the effective prize winning lines, the CPU31 immediately stops the first rotation reel 3 from rotating.

If the judgment is made by the CPU 31 that the target symbol mark associated with the concerned prize winning state is not located on any of the effective prize winning lines of the observation window 6, each of symbol marks to be appeared on any of the effective prize winning lines is checked for every rotation angle of the first rotation reel 3 up to the number of symbol marks to be controlled (i.e., four times). If the judgment is made by the CPU 31 that the target symbol mark representative of the concerned prize winning request flag is located up to the number of symbol marks to be controlled, the number of symbol marks located between the target symbol mark and the symbol mark currently located on any of the effective prize winning lines is defined as "the number of symbol marks to be shifted" and the first rotation reel 3 is rotated for the number of symbol marks to be shifted, and then stopped from rotating. The shift control process is performed in the same manner when the stop control operation is performed for the second and third rotation reels 4 and 5.

Figure 19:
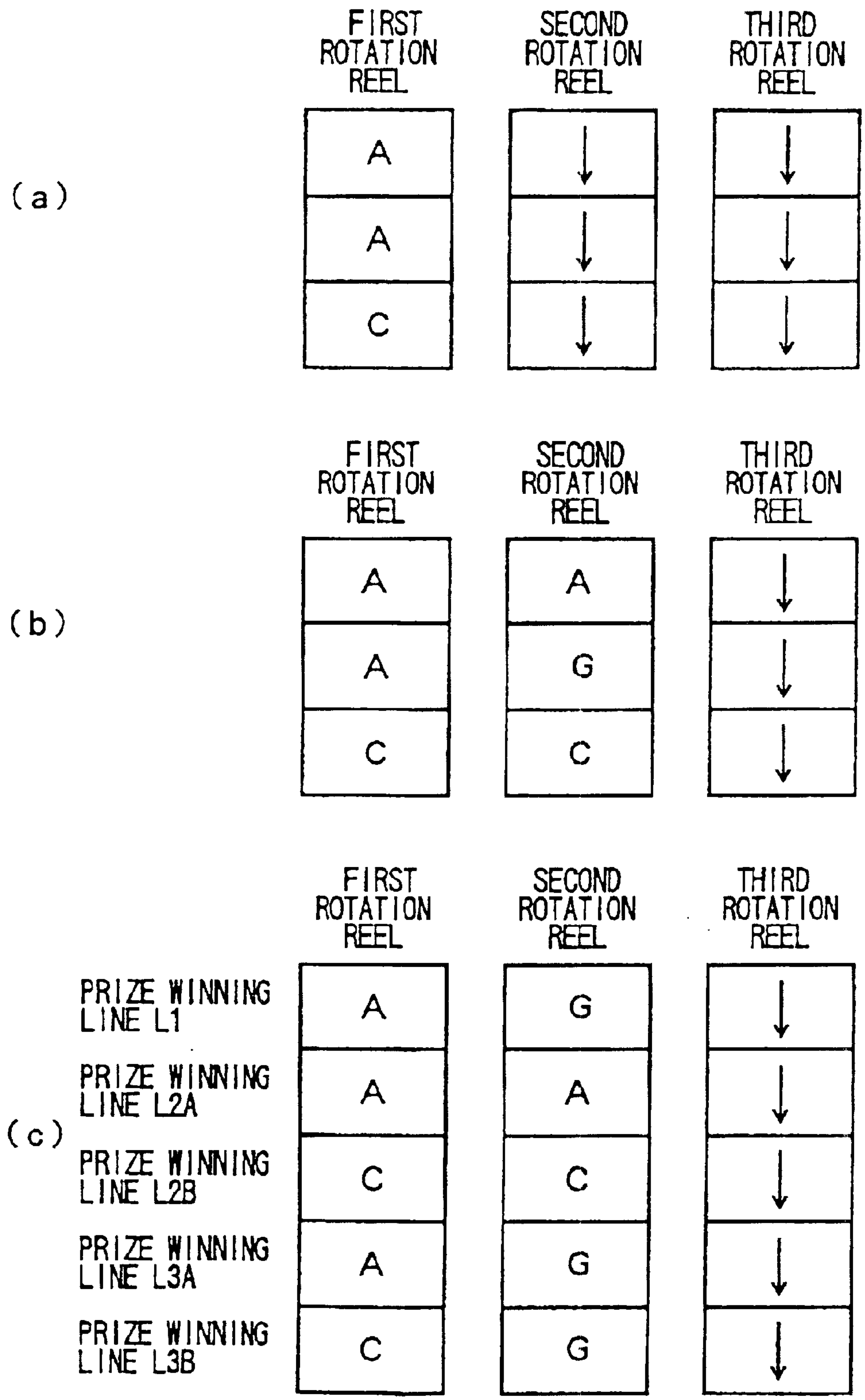

When the stop button 17 for the second rotation reel 4 is turned on, the stop control process is performed for the second rotation reel 4. At this time, with the second rotation reel 4 rotating, every possible combination of symbol marks of symbol codes 0 to 20 of the second rotation reel 4 which may appear on the center prize winning linen L1 of the observation window 7 and the symbol marks of the first rotation reel 3 stopped on the effective prize winning line is read from the RAM 33 using the symbol code. On the other hand, for the third rotation reel 5, a rotation code indicating that the rotation reel is rotating is read from the RAM 33. The second rotation reel 4 is assumed to be stopped from rotating by means of the stop control operation, thereby resulting in that the anticipated symbol codes are read from the RAM in stead of the rotation code although the second rotation reel 4 is rotating, When every possible combination of symbol codes is read from the RAM 33, the respective prize winning state corresponding to each of the combinations of symbol codes is sequentially judged on the basis of the aforesaid winning symbol combination table. For instance, if the first rotation reel 3 is stopped from rotating as shown in FIG. 19(*a*), each of the combinations of 21 possible stop positions of the second rotation reel 4 and the known position of the first rotation reel 3 is sequentially checked. If the second rotation reel 4 is stopped from rotating with the result that the symbol mark of the code number "1" is displayed in the middle of the observation window 7, the respective combinations of symbol codes appeared on each of the effective prize winning line L1, L2A, L2B, 13A, and 13B are shown in FIG. 19(*c*).

In FIG. 19(*c*), although the position of the third rotation reel 5 is shown with the rotation code, two possible prize winning states, i.e., the big prize winning state of "A—A—A" on the effective prize winning line L2A and the small prize winning state of "C—C—C" on the effective prize winning line L2B can be anticipated. As a result, for the code number "1" of the second rotation reel 4, expectation flags of the big prize winning state and the small prize winning state are set as shown in FIG. 20. Presence or absence of such expectation flag is checked for all the possible code numbers of the second rotation reel 4 and the concerned data is stored in the RAM 33.

When the second rotation reel 4 is stopped from rotating by means of the stop control operation, the expectation flag data stored in the RAM 33 are referred to. Namely, when the operation of the stop button 17 of the second rotation reel 4 by the game player is detected, all the expectation flags related to the code numbers of the second rotation reel 4 is referred to. If the big prize winning state is expected, the second rotation reel 4 is stopped from rotating by means of the stop control operation so that the set of symbol marks representative of the big prize winning state are stopped and displayed on the effective prize winning line.

When the judgment is made by the CPU 31 that the stop button 18 of the third rotation reel 5 is turned on, the stop control process is performed for the third rotation reel 5. By this time, the first and second rotation reels 3 and 4 have already been stopped from rotating, thereby making it possible for the combination of their symbol marks to be known. Every possible combination of symbol marks of symbol codes 0 to 20 of the third rotation reel 5 and the known set of the remaining symbol marks of the first and second rotation reels 3 and 4 is read from the RAM 33, and the respective prize winning state corresponding to each of the aforesaid combination is sequentially judged. A prize winning expectation flag is set in the same manner as shown in FIG. 20.

When the stop button 18 of the third rotation reel 5 is operated by the game player, the expectation flag data is referred to. At this time, if the big prize winning expectation flag is set, the third rotation reel 5 is stopped from rotating by means of the stop control operation on the basis of the aforesaid expectation flag so that the set of symbol marks representative of the big prize winning state are stopped and displayed on the effective prize winning line. The stop control operation is operated to stop the third rotation reel 5 from rotating so that the set of the symbol marks representative of the target prize winning expectation flag could be stopped and displayed and, in addition, the set of the symbol marks representative of the prize winning state which the target expectation flag does not indicate will not be stopped and displayed.

The reel stop process by the stop and display control means is not performed for the first and second stop rotation reels in the CT period. Accordingly, if the first and second stop rotation reels are the first and second rotation reels 3 and 4, respectively, as described the aforesaid example, each of the rotation reels 3 and 4 is stopped from rotating immediately when the respective stop button 16 or 17 is operated. In other words, each of the rotation reels 3 and 4 is stopped from rotating only at the time of the operation of the respective stop button 16 or 17 by the game player, but not by the stop and display control means 73.

The stop and display control operation is performed for the third stop rotation reel in the CT period. The number of symbol marks to be controlled in the CT period is "1" or "o" as shown in FIG. 18(*b*). The number of symbol marks to be controlled in the CT period is less than the number of symbol marks to be controlled in the regular game condition i.e., "4". Accordingly, if the third stop rotation reel is the third rotation reel 5, as described in the aforesaid example, and if the symbol mark representative of the target prize winning state is not located on any of the effective prize winning lines of the observation window 8 at the time of the operation of the stop button 18, the judgment is made by the CPU 31 if the target symbol mark representative of the target prize winning state is located within one or zero symbol mark from the effective prize winning line.

For instance, if the symbol marks of "hat" or "cactus" are aligned on the first and second rotation reels 3 and 4, the symbol mark of "hat" or "cactus" is shifted up to one symbol mark on the third rotation reel 5. Namely, if the symbol mark of "hat" or "cactus" is not located on any of the effective prize winning lines of the observation window 8 at the time of the operation of the stop button 18, but the symbol mark of "hat" or "cactus" is located within one symbol mark, the third rotation reel 5 is shifted for one symbol mark by the stop and display control means 73 with the result that the set of symbol marks representative of the prize winning state of "hat" or "cactus" are aligned. On the other hand, in the cases of "upper sun half" and "lower sun half" prizes, the number of symbol marks to be shifted is 0, thereby causing no shift control to be performed by the stop and display control means.

When the reel stop control process is completed, prize winning search process is performed (see FIG. 12, S116). In the step S116, the type of a prize winning flag indicating the set of symbol marks actually aligned on any of the effective prize winning lines is matched with the prize winning request flag determined as a result of the probability lottery process (S116). In the step S117, the judgment is made by the CPU 31 if the prize winning flag is normal or not (S117). If the judgment is made by the CPU 31 that the prize winning flag is not normal, e.g., if the "cactus" prize winning request flag is set although a set of symbol marks of "hat" are aligned on any of the effective prize winning lines, the step S117 proceeds to the step S118 wherein "illegal error", is displayed in the payout medal number indication lamp (S118).

If the judgment is made by the CPU 31 that the prize winning flag is normal, the step S117 proceeds to the step S119 wherein the judgment is made by the CPU 31 on whether the number of winning game medal is zero or not (S119). If the judgment is made by the CPU 31 that the number of winning game medal is not zero, the step S119 proceeds to the step S120 wherein the number of game medal(s) is paid out or added to the number of credit game medal(s) (S120). Namely, if the game is played with the credit game medal(s), the number of the winning game medals is added to the number of the credit game medals, and if the game is played with the game medal(s) inserted in the medal inserting slot 9, the number of the winning game medals is paid out in the medal receptacle 20 (S 120).

In the step S121, the judgment is made by the CPU 31 on whether the "replay" prize is won or not (S121), and if the judgment is made by the CPU 31 that the "replay" prize is won, the automatic game medal investing request is set (S122). In the step S123, the initialization process is performed, i.e., all the areas of the RAM33 used in the game are initialized (S 123) and one game play ends.

In the preferred embodiment, the stop positions of symbol marks of the rotation reels in the CT period mostly depend upon the operational skill of the stop buttons by the game player as described hereinbefore. In the embodiment according to the present invention, a new symbol mark of "sun" constituted by the symbol marks of "upper sun half" and "lower sun half" is made. The symbol mark of "sun" has a diameter of is approximately the same as that of the rotation reel width of the rotation reel band 54, thereby making it possible for the game player to easily recognize the symbol mark of "sun" by carefully observing any of the axially end parts of the rotation reel band 54 even while the rotation reel is rotating. This leads to the fact that the game player with no skill can easily perform the observation push thereby enabling the symbol marks of "upper sun half" and "lower sun half" to be stopped and displayed on any of the effective prize winning lines.

The small prize winning with one or seven game medals awarded is won if only the symbol mark of "upper sun half" or "lower sun half" of the first rotation reel 3 is stopped from rotating on any of the effective prize winning lines. Therefore, it would be a great help for an inexperienced game player, only if the new symbol mark of "sun" is provided on the first and third rotation reels 3 and 5. As a result, the CT machine is well accepted by the inexperienced game player as well as the skillful game player who can exercise his or her skill in the CT period.

In the aforesaid embodiment, the "sun group" prize can be won in the CT period only. In other words, the "sun group" prize can be won only if a set of symbol marks representative of two prize winning states, i.e., both the symbol marks of "upper sun half" and "lower sun half" are stopped from rotating concurrently on any of the effective prize winning lines of the observation windows 6, 7 and 8 in the aforesaid CT period. This reason is attributed to the fact that different prize winning numbers, i.e., different prize winning request flags are assigned to "lower sun half" and "upper sun half". Two different prize winning request flags cannot be set concurrently in the same probability lottery process (a small prize winning request flag is discarded whenever a subsequent probability lottery process starts). This leads to the fact that the set of symbol marks indicative of the "sun" prize winning state cannot be stopped and displayed in any of the effective prize winning lines of the observation windows 6, 7 and 8 in the regular game condition. In the foregoing embodiment according to the present embodiment, the "sun group" prize may be won in the regular game condition.

In the foregoing embodiment, the lottery data table specific to the game-condition shown in FIG. 15 is modified to the table as shown in FIG. 21. The lottery data table specific to the game condition shown in FIG. 21 includes small prize winning groups in the regular game condition and BB regular game condition, thereby enabling a plurality of small prize winning states to be concurrently requested. The small prize winning group includes the "small prize" group constituted by "lower sun half", "upper sun half", "cactus", and "hat, and the "sun" group constituted by "lower sun half" and "upper sun half".

In the embodiment, if the stop button 16 is operated when the "sun" group prize winning state (prize winning number "1") is requested in the regular game condition, i.e., the No.8 symbol mark (see FIG. 2) of the left rotation reel 3 is displayed on the upper prize winning line L2A, the symbol mark of "lower sun hall" is stopped and displayed on the center prize winning line L1, the symbol mark of "upper sum half" is stopped and displayed on the upper prize winning line L2A as if the small prize winning state of "sun" would appear. More precisely, two different prize "winning states of "lower sun half" and "upper sun half" are won concurrently. In the aforesaid case, the dividend rates of "lower sun half" and "upper sun half" are one and seven, respectively, as shown in the dividend rate table of FIG. 6. If three game medals are invested in betting, the dividend rate results 1×2 +7=9. Furthermore, if the set of two symbol marks representative of the small prize winning state "sun" are stopped and displayed on the center prize winning line L1 and lower prize winning line L2B, the dividend rate results 1 +7×2 =15. On the other hand, although the "sun group" prize winning request flag is set, only "lower sun half" or "upper sun half" prize may be won if the game player fails to operate the stop button at the right time.

As it is to be understood that the slot machine according to the present invention comprises shift and display means 71 for shifting and displaying various kinds of symbol marks 3*a*, 4*a* and 5*a*, the shift and display means 71 having prize winning lines formed thereon. The slot machine is operative to have a predetermined set of symbol marks stopped and displayed on one of the prize winning lines. The predetermined set of symbol marks thus stopped and displayed on one of the prize winning lines cause a wining prize to be awarded to a game player. The predetermined set of symbol marks includes a plurality of symbol marks neighboring to each other to form a specified symbol mark. Here, the term "specified symbol mark" is intended to mean a special combination of symbol marks neighboring to each other. The specified symbol marks is exemplified in this embodiment to include a combination of upper and lower halves (s1, s2) of the sun shown by the reference legend "S" in FIG. 2. The combination of upper and lower halves of the sun collectively constitutes a sun group (see FIG. 21), i.e., one of the prize winning group which is associated with two small prize winning states having two small prizes concurrently awarded to the game player according to the present invention. The numbers of symbol marks and respective prize winning states are not limited to the embodiment. For instance, the aforesaid specified symbol may be constituted by three symbol marks having three small prizes concurrently awarded to the game player.

The specified symbol mark is required to be in the form of an easy-viewable profile which can be easily identified from other symbol marks according to the present invention.

As will be seen from the symbol mark "S" in FIG. 2, the specified symbol mark includes a first semicircular symbol mark (s1), e.g., upper half of the sun, formed in the shape of an upper half of a circular configuration having a diameter approximately equal to the lateral width of the observation windows 6 or 8, and a second semi-circular symbol mark (s2), e.g., lower half of the sun, formed in the shape of a lower half of a circular configuration and neighboring to the first semi-circular symbol mark to complete a circle in cooperation with the first semicircular symbol mark.

In this embodiment of the slot machine, the small prize winning state can be won in the regular game operation in association with the specified symbol mark with the stop button operated by the game player while the big prize winning state or the medium prize winning state is not requested. In the conventional game machine, such a small prize winning state in association with the specified symbol mark was allowed to be won only in its CT period. In view of the problem encountered by the conventional apparatus, the slot machine according to the present invention is contemplated to provide various types of symbol marks indicative of respective prize winning states and easy to be recognized. This makes it possible for the game player to readily perform the observation push, thereby enabling the game player to enjoy a game without any experience of operating the observation push.

FIG. 21 is a lottery data table specific to the game condition available for the process of provability lottery in the modified example of the slot machine according to the present invention. As will be seen from the lottery data table, the small prize winning states are each designed to be requested separately from one another depending on the game conditions, or otherwise, the small prize winning states can be requested in combination with other small prize winning states depending on the game conditions. In addition, the combination of the small prize winning states can cause the respective prize winning groups to be changed depending on the game conditions. It is thus to be noted that the plurality of the small prize winning states are changed in accordance with the game condition.

According to the lottery data table, it will be understood that the "lower sun half" and 'upper sun half' prizes are concurrently won with the stop button operated by the game player if the "sun" group prize winning state is requested in the probability lottery process of the regular game condition. On the other hand, the group prize winning state cannot be requested in the BB/RB inner winning game condition. In other words, if the BB or RB prize winning state is requested, i.e. BB or RB prize is internally won (BB or RB prize winning request flag is set in the machine), the "lower sun half" and "upper sun half" prizes cannot be concurrently won. This leads to the fact that when the game player supposes that the BB or RB prize may be internally won, he or she can confirm the game condition by operating the stop button at the time at which both the symbol marks of "upper sun half" and "lower sun half" are aligned on any of the effective prize winning lines. If the "upper sun half" and "lower sun half" prizes are concurrently won, the BB or RB prize is not internally won. On the other hand, if the rotation reel corresponding to either of the symbol marks of "upper sun half" or "lower sun half" is shifted, and thus "upper sun half" and "lower sun half" prizes fail to be concurrently won, the BB or RB prize is internally won. Needless to mention that the "upper sun half" and "lower sun half" prizes may fail to be concurrently won in the regular game condition if the game player operate the stop button at an inappropriate timing.

As shown in the lottery data table shown in FIG. 21, all the small prize winning states are regarded to belong to the one group called "small prize" group when the probability lottery process is performed under the BB regular game condition. The probability of winning any of the small prize winning states under the BB regular game condition is generally higher than that under the regular game condition. This results in the fact that the probability of actually winning any of the small prizes under the BB regular game condition is higher than that under the regular game condition. This means that the game player is keen for winning game medals as many as possible in the BB regular game condition. In general, the game player with no skill of the observation push tends to fail to win any of the small prizes. The game machine of the embodiment provides easy viewable symbol marks, thereby making it possible for such game player with no skill to select and focus on the easy viewable symbol marks ("sun", etc.), and thus facilitating the observation push.

As described above in the embodiment, a group of the prize winning states is changed depending on the game condition (or the game condition flag), thereby making it possible to notify the game player of the changeover of the game condition or, presence or absence of the game condition flag. In addition, the game player select and focus on easy-viewable symbol mark(s) when he or she stops the stop button.

Furthermore, in the embodiment, the dividend rates of "lower sun half" and "upper sun half" are seven and one, respectively. On the other hand, if the dividend rate of either symbol mark is changed to zero (no dividend rate), the prize winning state associated with the symbol mark of "sun" can be defined in the regular game operation without using a method which enables two winning prizes to be concurrently won. For instance, the dividend rate of "upper sun half" in FIG. 6 can be changed to zero, and at the same time, the lottery data of "upper sun half" representative of the winning state number 2 in FIG. 15 can be deleted. In this case, if the set of symbol marks representative of the "sun" group are stopped and displayed on any of the effective prize winning lines in the regular game condition, the number of winning game medals is that for the "lower sun half" prize only, i.e., seven game medals are paid out. In this manner, the prize winning state associated with a specified symbol mark constituted by a plurality of symbol marks can be defined in the regular game operation. Furthermore, the method that enables two winning prizes to be concurrently won causes at least two game medals to be paid out for the winning prize associated with the specified symbol mark, i.e., the two small prize winning states won in one game. On the other hand, the game machine of the embodiment does not use the method that enables two winning prizes to be concurrently won, thereby making it possible to reduce the number of game medals to be paid out for the specified symbol mark to one.

The CT machine according to the present invention has been described hereinbefore. The present invention can be applied to a slot machine that is not provided with the CT function as well. If the slot machine without the CT function is provided with the shift and display means which enables a specified symbol mark constituted by a plurality of symbol marks neighboring to each other to be shifted and displayed on the prize winning line, in addition to the stop and display control means, even the inexperienced game player can easily select and focus on the specified symbol mark and thus observation push is greatly facilitated.

The game machine according to the present invention is exemplified by, but not limited to, the slot machine in the aforesaid embodiment, in which the stop and display control operation by means of the stop and display control means 73 is interrupted for the two rotation reels, which has been referred to as first and second rotation reels, but the stop and display control operation is still performed for the remaining rotation reel, which has been referred to as the third rotation reel, during the CT period. In another embodiment of the game machine according to the present invention, the number and type of rotation reels which the stop and display control operation by means of the stop and display control means is interrupted for, and the number and type of rotation reel(s) which the stop and display control operation is performed for may be different. For instance, the stop and display control operation by means of the stop and display control means may be interrupted for the third stop rotation reel. Furthermore, in another embodiment, the stop and display control operation by means of the stop and display control means may be interrupted for all the stop rotation reels.

The game machine according to the present invention is exemplified by, but not limited to, the slot machine in the aforesaid embodiment having the rotation reels 3, 4 and 5 forming part of the shift and display means. According to the present invention, the shift and display means may include an LCD (liquid crystal display), an LED (light-emitting diode), and an electroluminescence other than the rotation reels 3, 4 and 5. Even in the case that the LCD (liquid crystal display), the LED (light-emitting diode), and the electroluminescence are used as shift and display means, the same effect as that of the aforesaid embodiments can be obtained.

The present invention therefore can provide a game machine that displays a specified symbol mark, i.e., a large symbol mark constituted by a plurality of symbol marks neighboring to each other. Such a large symbol mark occupies a large area of the observation window, thereby making it possible for the game player to distinguish the large symbol mark from the other symbol marks even while the rotation reel is rotating. In other words, the large symbol mark is easy-viewable. This leads to the fact that the large symbol mark facilitates the observation push of the game player so that the game player even with scarce experience can enjoy the game.

As will be understood from the foregoing descriptions, the game machine according to the present invention is designed to ensure that two small prizes are won in the regular game condition, thereby making it possible for the specified symbol mark to be stopped and displayed on the prize winning line by means of the shift and display means. This leads to the fact that the fun of the game player can extensively be stimulated while playing in the regular game condition. Even under the regular game condition, the large symbol mark facilitates the observation push of the game player so that the game player even with scarce experience can enjoy the game as described hereinbefore.

The game machine according to the present invention is designed to have the prize winning groups each associated with a plurality of small prize winning states corresponding to one segment of the lottery data table used for the lottery action run in the game machine. The game machine thus programmed can change the combinations of small prize winning states each associated with the respective prize winning group in accordance with the game condition. Similarly, the fun of the game player can extensively be stimulated while playing in the regular game condition. In addition, the kinds of prizes won under current game condition can make the game player to recognize about the various kinds of winning prizes possibly occurring in the following game, thereby making it possible for the interest of the game player to be multiplied.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. A game machine comprising:

shift and display means for shifting and displaying various kinds of symbol marks; said shift and display means is partly constituted by a plurality of observation windows, and having prize winning lines formed thereon; and shift and display stop means allowing a game player to selectively stop and display said symbol marks shifted and displayed by said shift and display means, wherein said symbol marks are consecutively displayed on each adjacent observation window, and in which a predetermined set of symbol marks stopped and displayed on one of said prize winning lines cause a winning prize to be awarded to the game player, said predetermined set of symbol marks including a plurality of symbol marks neighboring to each other to form a specified symbol mark having a diameter approximately equal to the lateral width of said observation windows, and said specified symbol mark having a lateral dimension greater than that of each of symbol marks other than said symbol marks forming said specified symbol mark, a random number generator for generating random numbers divided into a plurality of random number segments; a random number sampler for sampling a random number from the random numbers generated by said random number generator; storage means for storing table data having a plurality of predetermined reference values defining said random number segments;

winning state determining means for determining a winning state on the basis of the sampled random number using said reference values of said table data;

stop control means for controlling the stop of said shift and display means to have a set of symbol marks stopped and displayed on the basis of the winning state determined by said winning state determining means, and stop control interruption means for interrupting said stop control means for a predetermined period.

2. A game machine as set forth in claim 1, wherein said shift and display means includes a plurality of rotation reels each having various kinds of symbol marks drawn on the outer surface thereof.

3. A game machine as set forth in claim 1, wherein said game machine includes a slot machine.

4. A game machine as set forth in claim 1, in which said specified symbol mark includes a first semi-circular symbol mark formed in the shape of an upper half of a circular configuration having a diameter approximately equal to the lateral width of said observation window of said shift and display means, and a second semi-circular symbol mark formed in the shape of a lower half of a circular configuration and neighboring to said first semi-circular symbol mark to complete a circle in cooperation with said first semi-circular symbol mark.

* * * * *